(12) United States Patent
Cameron et al.

(10) Patent No.: US 9,121,939 B2
(45) Date of Patent: Sep. 1, 2015

(54) SELF CALIBRATION FOR CRANE GEOMETRY

(71) Applicant: Trimble Navigation Limited, Sunnyvale, CA (US)

(72) Inventors: John F. Cameron, Los Altos, CA (US); Jean-Charles Delplace, Nice (FR); Nicholas C. Talbot, Ashburton (AU); Kevin Legendre, Compiegne (FR)

(73) Assignee: Trimble Navigation Limited, Sunnyvale, CA (US)

( * ) Notice: Subject to any disclaimer, the term of this patent is extended or adjusted under 35 U.S.C. 154(b) by 222 days.

(21) Appl. No.: 13/835,869

(22) Filed: Mar. 15, 2013

(65) Prior Publication Data

US 2014/0278078 A1 Sep. 18, 2014

(51) Int. Cl.
G06F 19/00 (2011.01)
G01S 19/42 (2010.01)
G01S 19/53 (2010.01)
B66C 13/46 (2006.01)

(52) U.S. Cl.
CPC .................. G01S 19/42 (2013.01); B66C 13/46 (2013.01); G01S 19/53 (2013.01)

(58) Field of Classification Search
None
See application file for complete search history.

(56) References Cited

U.S. PATENT DOCUMENTS

2012/0242540 A1  9/2012  Feller et al.
2012/0271582 A1  10/2012  Bageshwar et al.
2014/0020083 A1  1/2014  Fetik et al.

FOREIGN PATENT DOCUMENTS

DE  19715458 A1  10/1998
WO  2009084819 A1  7/2009
WO  2013006625 A2  1/2013

OTHER PUBLICATIONS

"PCT/US2014/029855 International Search Report and Written Opinion", Jul. 28, 2014, 14 Pages.

Primary Examiner — Thomas Tarcza
Assistant Examiner — Garrett Evans

(57) ABSTRACT

Methods and systems are disclosed for calibrating a crane for crane geometry. A Global Navigation Satellite System (GNSS) receiver antenna is disposed on a point along a boom assembly of the crane, the crane configured to pivot about a pivot point. A working arm of the crane is rotated about the pivot point to at least three different positions. Three locations are determined in a geo-referenced coordinate system of the at least three different positions. A location of the pivot point is determined based on the three locations.

29 Claims, 18 Drawing Sheets

Environment
400
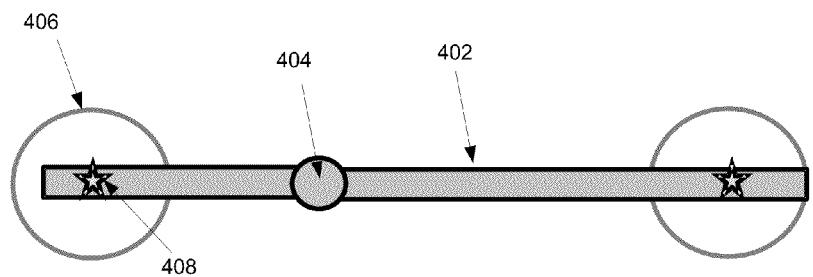
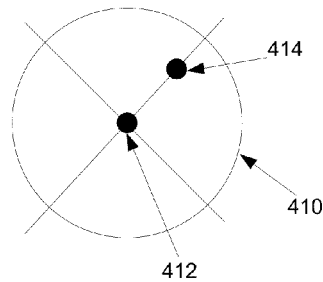
Fig. 4

Process
600

A GLOBAL NAVIGATION SATELLITE SYSTEM (GNSS) RECEIVER ANTENNA IS PROVIDED AND DISPOSED ON A POINT ALONG A BOOM ASSEMBLY OF A CRANE.
602

AT LEAST ONE KNOWN AND FIXED REFERENCE POINT IS PROVIDED IN A GEO-COORDINATE REFERENCE SYSTEM RELATED TO THE REFERENCE SYSTEM UTILIZED BY A GNSS RECEIVER COUPLED WITH THE GNSS RECEIVER ANTENNA, THE KNOWN FIXED REFERENCE POINT PROXIMATE A WORKING ENVIRONMENT OF THE CRANE.
604

ROTATING THE WORKING ARM AROUND A PIVOT POINT OF THE CRANE TO A SPECIFIC POINTING ANGLE.
606

USING THE GNSS RECEIVER ANTENNA WHILE AT THE SPECIFIC POINTING ANGLE AND THE LOCATION OF THE REFERENCE POINT TO DETERMINE A WORKING ARM POINTING ANGLE RELATIVE TO A REFERENCE DIRECTION.
608

Fig. 6

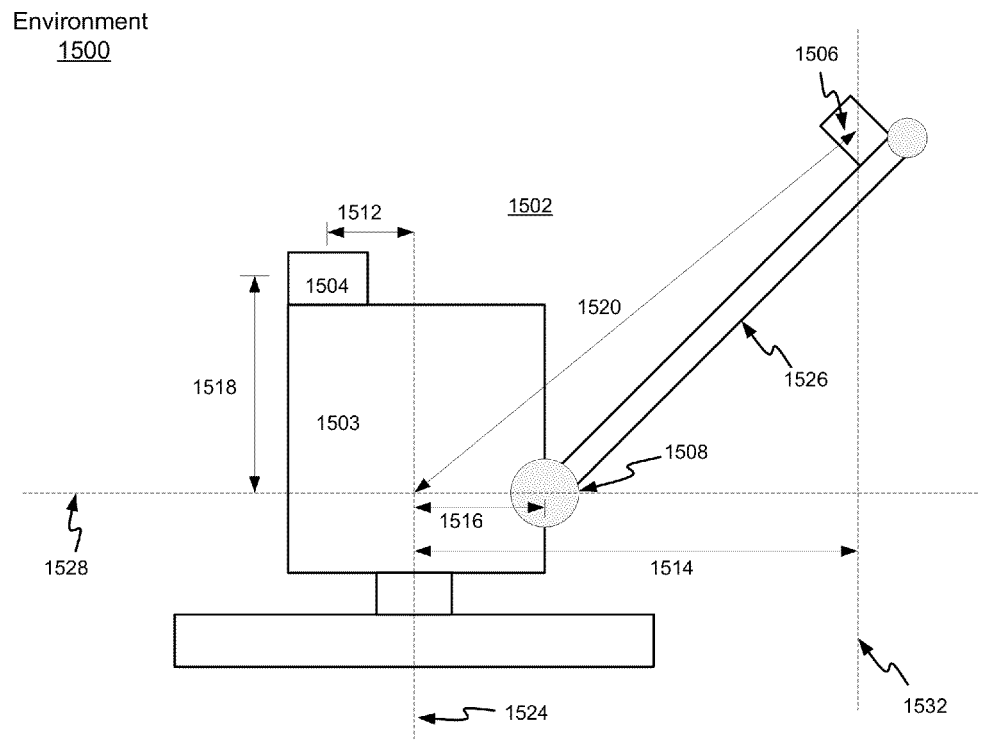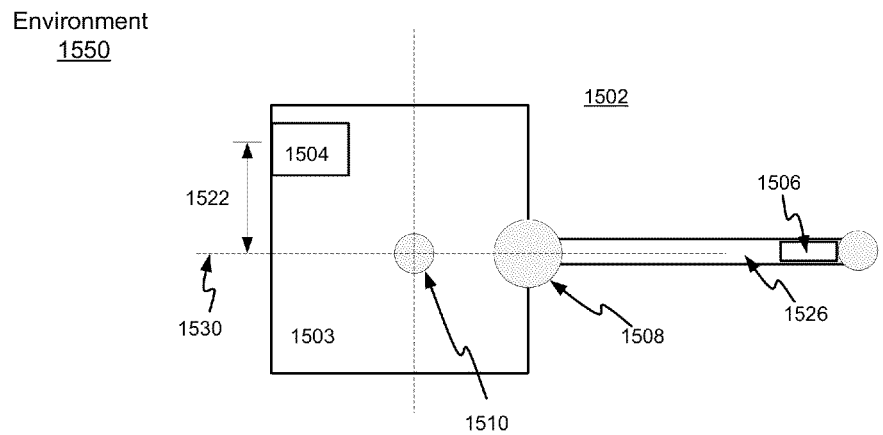
Fig. 15

SELF CALIBRATION FOR CRANE GEOMETRY

CROSS REFERENCE TO RELATED APPLICATIONS

The present patent application is related to U.S. patent application Ser. No. 13/836,131, filed Mar. 15, 2013, entitled "CRANE BOOM POINTING ANGLE DETERMINATION", by Cameron et al, assigned to the assignee of the present invention.

BACKGROUND

Lifting devices, such as cranes, are employed to hoist or lift objects to great heights. The crane may swivel or pivot about a pivot point to allow the crane to lift and move objects into position. It may be desirable to know the pointing angle of the crane. If a crane is very high off the ground, then it may be difficult to determine the pointing angle of the crane visually from the ground. Moreover, a visual observation of a crane's pointing angle may not be accurate.

BRIEF DESCRIPTION OF THE DRAWINGS

The accompanying drawings, which are incorporated in and form a part of this application, illustrate and serve to explain the principles of embodiments in conjunction with the description. Unless noted, the drawings referred to this description should be understood as not being drawn to scale.

FIG. 4 is a block diagram of a crane in an environment shown with error ellipsoids in accordance with embodiments of the present technology.

FIG. 6 is a flowchart of a method for determining a working arm pointing angle relative to a reference direction on a crane in accordance with embodiments of the present technology.

FIG. 15 is a block diagram of a crane system in accordance with embodiments of the present technology.

DESCRIPTION OF EMBODIMENT(S)

Figure 1A:
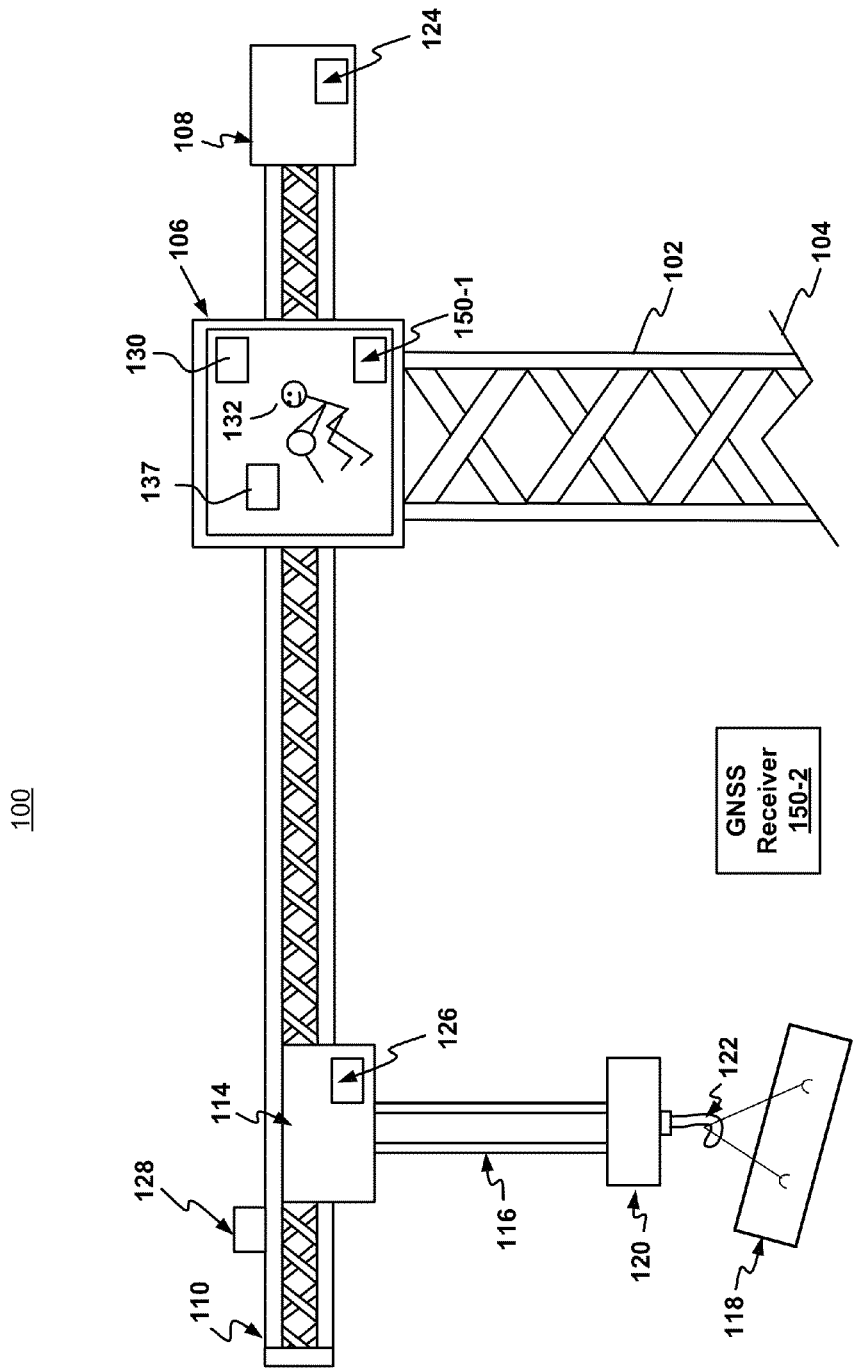
FIG. 1A is block diagram of a tower crane system in accordance with embodiments of the present technology.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "determining", "utilizing", "ceasing", "using", or the like, often refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

Embodiments described herein are for self-calibrating for crane geometries and for determining a working arm pointing angle of a crane relative to a reference direction. As a crane or other lifting device operates, it may rotate about a pivot point. At any given moment, the working arm of the crane is pointing in a direction. For example, from a top down view, a horizontal crane may be able to rotate three hundred and sixty degrees and point in any direction. The direction may be given as an angle in a coordinate system such as a geo-referenced coordinate system. The present technology describes systems and processes for self-calibrating for crane geometries, for determining a working arm pointing angle of a crane relative to a reference direction, or for a combination thereof.

The working arm pointing angle of the crane may be determined using a global navigation satellite system (GNSS) antenna and receiver. Data from the GNSS receiver and antenna are collected for positions of the antenna on the crane as the crane moves or rotates. For example, data may be collected from three different positions of the crane as it rotates. The crane may stop or pause for a period of time in each position, during this time the data is collected. This data is then employed to determine the geographical location of each of the positions of the antenna on the crane. In one embodiment, three positions are determined; these three positions are then used to determine the pivot point of the crane. Specifically, a circle may be described as intersecting each of the three positions where the center of the circle is the pivot point of the crane. The pivot point of the crane may be described as a position within a coordinate system.

Once the pivot point of the crane is known, the crane may then rotate to any random position, the current location of the GNSS receiver antenna is used with the pivot point position to determine the pointing angle of the working arm of the crane. The pointing angle is the angle between the direction the crane is pointing and a reference direction. For example, the reference direction may be true north with the pointing angle being measured either clockwise or counter clockwise from true north or other reference direction. The pointing angle can be displayed on a map or other interface. Thus the present technology may be employed to determine the pointing angle of the working arm of a crane. Such information may be generated automatically and may be displayed to a crane operator or other personnel associated with the crane. The information may also be transmitted to a remote location such as a headquarters for a construction project. The information may also be employed for various crane operations such as automated crane operations.

In one embodiment, only one GNSS receiver and antenna are employed for determining the location of a pointing angle. However, in various embodiments, a plurality of receivers and antennas may be employed. In one embodiment, known fixed locations or reference points may also be employed to determine the location of the pointing angle. Such known and fixed reference locations may be the pivot point of the crane or may be a reference point external to the crane but within the crane's operating environment.

Self-calibration for Crane Geometry and Crane Pointing Angle

With reference now to FIG. 1A, an illustration of a side view of a tower crane 100 is presented, according to various embodiments. Tower crane 100 may also be referred to as a horizontal crane.

Tower crane 100 includes a base 104, a mast 102 and a working arm (e.g., jib) 110. The mast 102 may be fixed to the base 104 or may be rotatable about base 104. The base 104 may be bolted to a concrete pad that supports the crane or may be mounted to a moveable platform. In one embodiment, the operator 132 is located in a cab 106 which includes a user interface 137.

Tower crane 100 also includes a trolley 114 which is moveable back and forth on working arm 110 between the cab 106 and the end of the working arm 110. A cable 116 couples a hook 122 and hook block 120 to trolley 114. A counterweight 108 is on the opposite side of the working arm 110 as the trolley 114 to balance the weight of the crane components and the object being lifted, referred to hereinafter as load 118.

Figure 9:
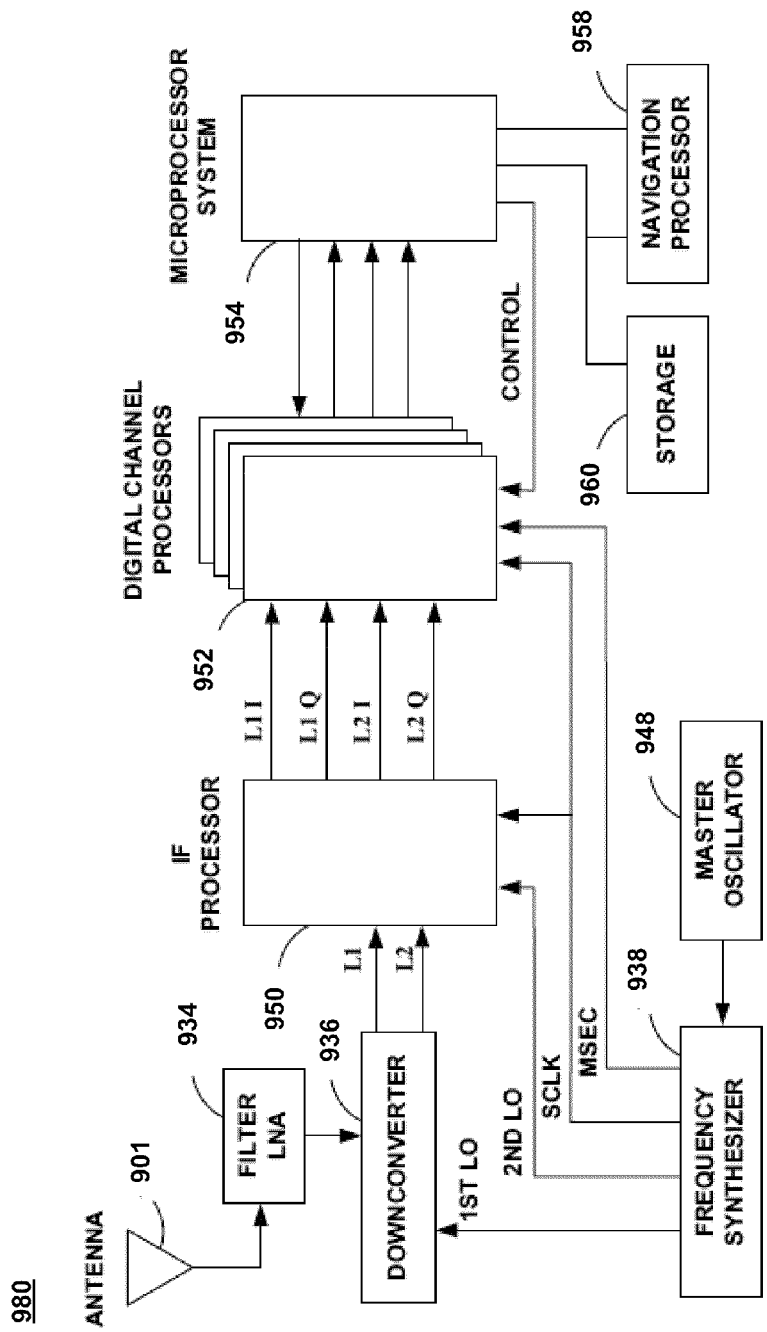
FIG. 9 is a block diagram of an example global navigation satellite system (GNSS) receiver which may be used in accordance with embodiments of the present technology.

Tower crane 100 also includes GNSS receiver antennas 124, 126, 128, and 130 each capable of receiving signals from one or more global positioning system (GPS) satellites and/or other positioning satellites, as is described in greater detail in reference to FIG. 9. Each of GNSS receiver antennas 124, 126, 128, and 130 are connected to, coupled with, or otherwise in communication with a GNSS receiver. In one embodiment, the GNSS receiver (e.g., GNSS receiver 150-1) may be connected or coupled to tower crane 100. For example, any of GNSS receiver antennas 124, 126, 128, and 130 may also include a separate receiver. In one embodiment, the present technology makes use of only one GNSS receiver antenna (e.g., antenna 124, antenna 126, or antenna 128) and one GNSS receiver. In one embodiment, the present technology makes use of a plurality of GNSS receiver antennas (e.g., antennae 124 and 128) in communication with only a single GNSS receiver (e.g., GNSS receiver 150-1 or 150-2). In one embodiment, the present technology makes use of a plurality of GNSS receiver antennas in communication with a plurality of GNSS receivers. In one embodiment, the GNSS receiver (e.g., GNSS receiver 150-2) is located remote to tower crane 100 and is in communication with the GNSS receiver antenna/antennae on the crane via a coaxial cable and/or a wireless communication link.

A GNSS receiver antenna may be disposed along a point of a boom assembly of tower crane 100. The boom assembly may be comprised of cab 106, counterweight 108, working arm 110, and trolley 114.

As depicted in FIG. 1A, a GNSS receiver antenna/antennae may be located at various points on tower crane 100. GNSS receiver antenna 124 is located on or part of counterweight 108. GNSS receiver antenna 126 is located on or part of trolley 114. By placing the GNSS receiver antenna 126 on trolley 114, the antenna may be positioned at a point far from the pivot point of the crane. The further the antenna is positioned from the pivot point, the greater the accuracy will be in determining the pointing angle of the working arm of the crane. This is due to errors inherent in determining an exact geographic position of a GNSS receiver antenna. The error may be described in statistical terms as an error ellipsoid. The error ellipsoid defines a three-dimensional region which is expected to contain the actual position of the antenna with a given level of confidence. When the distance between the pivot point and the GNSS receiver antenna are much greater than the size of the error ellipsoid, the error in determining the actual pointing angle of the working arm of the crane is reduced. In one embodiment, GNSS receiver antenna 128 is located on or part of working arm 110. It should be appreciated that a GNSS receiver antenna may be located at any part of working arm 110 and working arm 110 may have more than one GNSS receiver antenna. GNSS receiver antenna 130 is located on or part of cab 106. A GNSS receiver antenna may also be located on or part of the pivot point of tower crane 100.

Tower crane 100 may have a principal axis. In a top view of tower crane 100, the principal axis may be described as a fictional line that runs through the center of working arm 110, intersects the pivot point and runs through the center of counterweight 108. A GNSS receiver antenna may be located on the principal axis or may be offset from the principal axis. If the GNSS receiver antenna is offset from the principal axis, the present technology accounts for this offset in determining the pointing angle of the working arm of the crane.

Figure 1B:
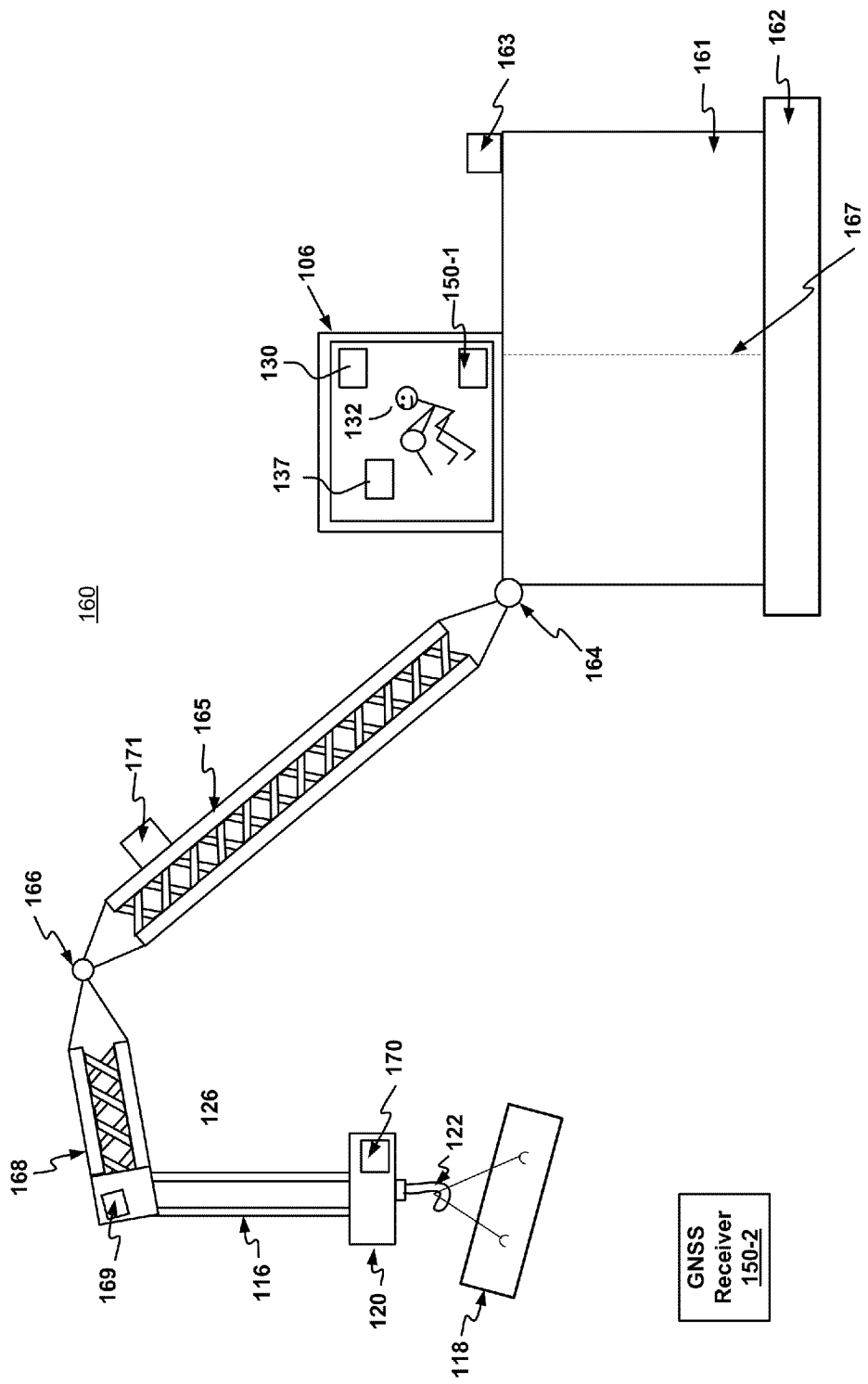
FIG. 1B is block diagram of a crane system in accordance with embodiments of the present technology.

With reference now to FIG. 1B, an illustration of side view crane 160 is presented, according to various embodiments. Crane 160 may also be referred to as a luffer crane or a level luffing crane. Crane 160 may comprise some of the components described for tower crane 100 of FIG. 1A.

Base 161 is a base or housing for components of crane 160 such as motors, electrical components, hydraulics, etc. In one embodiment, structure 162 comprises wheels, tracks, or other mechanics that allow for the mobility of crane 160. In one embodiment, structure 162 comprises outriggers that can extend or retract and are used for the stability of crane 160. In one embodiment, structure 162 is a platform for a stationary crane. It should be appreciated that base 161 is able to rotate, swivel, or pivot relative to structure 162 along axis 167. GNSS antenna 163 may be disposed on top of base 161 or may be disposed inside of base 161. GNSS antenna 163 will move and rotate with base 161 about axis 167.

Pivot point 164 allows for lattice boom 165 to pivot with respect to base 161. In this manner, lattice boom 161 can point in different directions and change angle of pivot point 166. Pivot point 166 allows for jib 168 to pivot and change position with respect to lattice boom 165 and base 161. A GNSS receiver antenna may be attached to or coupled with any component of crane 160. For example, pivot points 164 and 166 may have a GNSS receiver antenna coupled to them. GNSS receiver antennas 130, 163, 169, 170, and 171 depict various locations a GNSS receiver antenna may be located.

Figure 2A:
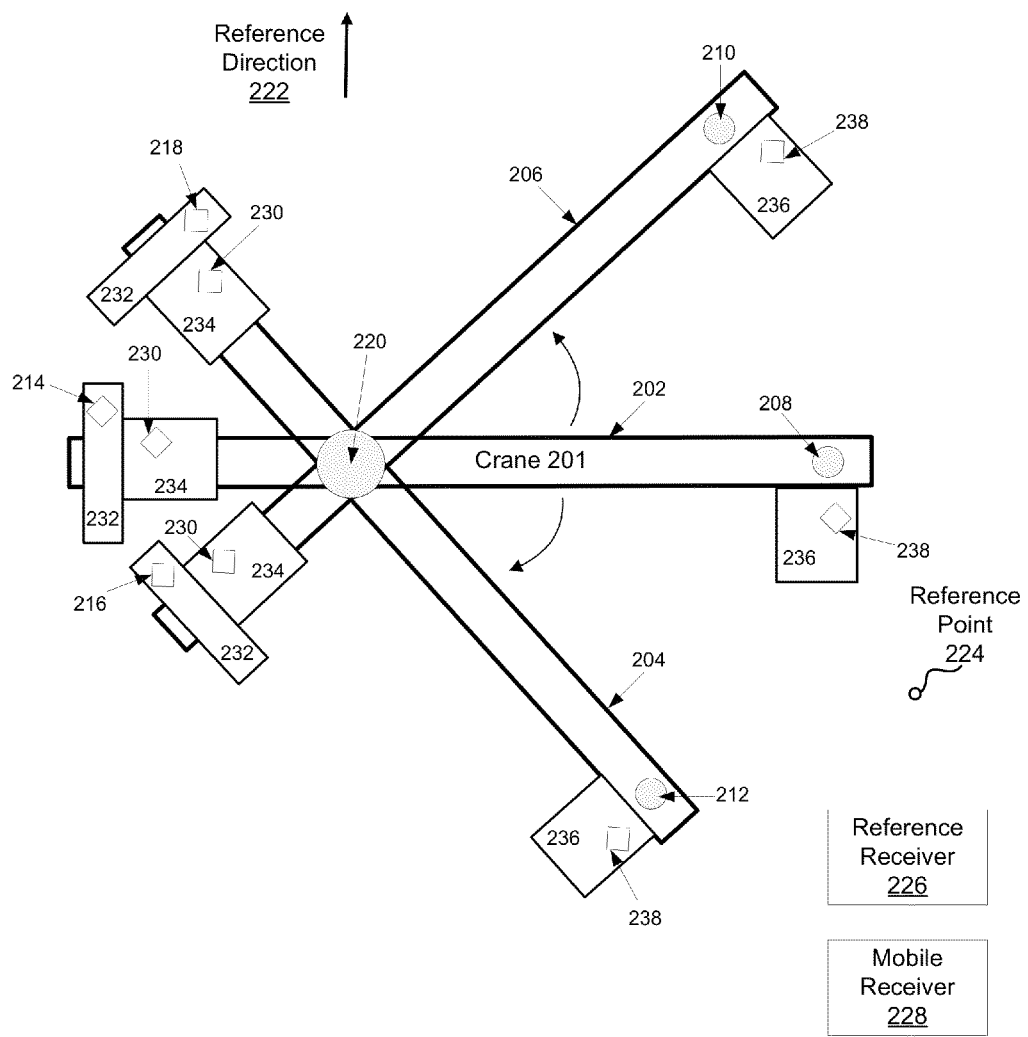
FIG. 2A is a block diagram of a crane in an environment in various positions in accordance with embodiments of the present technology.

It should also be appreciated that the present technology may be implemented with a variety of cranes including, but not limited to, a tower crane, a luffing crane, a level luffing crane, a fixed crane, a mobile crane, a self-erecting crane, a crawler crane, and a telescopic crane With reference now to FIG. 2A, a top view illustration environment 200 depicting crane 201 in three positions (202, 204, 206). It should be appreciated that crane 201 may have all the same capabilities and components of tower crane 100 of FIG. 1A or crane 160 of FIG. 1B. Position 202 depicts crane 201 in a first position. During regular operations of crane 201, crane 201 may periodically rotate to a different position. Position 204 and 206 show a second and third position of crane 201 respectively. Crane 201 rotates about pivot point 220. Crane 201 is depicted as having a GNSS receiver antenna at the end of the working arm in three positions 208, 210, and 212. Crane 201 is also depicted as having a GNSS receiver antenna at counterweight 232 in three positions 214, 216, and 218. Crane 201 also comprises cab 234 with GNSS receiver antenna 230 and trolley 236 with GNSS receiver antenna 238. Pivot point 220 may also comprise a GNSS receiver antenna. Positions 208, 210, 212, 214, 216, and 218 may also refer to the location(s) of GNSS receiver(s) collocated with an antenna. While crane 201 is depicted having more than one GNSS receiver antenna, it should be appreciated that crane 201 may only have one antenna in some embodiments or may have a plurality of GNSS receiver antennae in some embodiments. A GNSS receiver may be disposed in line with an principal axis of the working arm such as the GNSS receiver antenna positions depicted by positions 208, 210, and 212, or may be offset from the principal axis such as GNSS receiver antennas 230 and 238 as well as depicted by positions 214, 216 and 218.

The position of GNSS receiver antenna 238 may change as trolley 236 moves relative to the working arm. In an embodiment where crane 201 is a level luffing crane, such as crane 160 of FIG. 1B, the position of a GNSS receiver antenna relative to pivot point 220 as the lattice bottom of the crane is rotated relative to the base of the crane. In one embodiment, pivot point 220 is a top view of axis 167 of FIG. 1B about which base 161 rotates.

Crane 201 operates in an environment that may be described using a geo-referenced coordinate system where each point in real space coordinates with a location in the geo-referenced coordinate system. The coordinate system may be a coordinate system pre-programmed into a GNSS receiver used for the present technology. During the operations of crane 201, the GNSS receiver antennas receive signals from a GPS satellite. The receiving of the signal may be continuous or may only occur as needed. In other words, the receiver may cease receiving the signal from the antenna after sufficient data has been collected. The receiver may later receive new signals or new data from the antenna as necessary. As crane 201 rotates during its normal operations, the GNSS receiver antenna(s) are also moved into various positions. Data may be collected by a GNSS receiver associated with GNSS receiver antenna(s). This data may then be used for several purposes.

In one embodiment, the data collected related to the various positions of the GNSS antenna during crane operations is employed to determine geographic locations related to a coordinate system such as a geo-referenced coordinate system. These geographic locations may then be employed to determine the pivot point of the crane such as pivot point 220. For example, the antenna may be moved to three positions during normal operation of crane 201. Positions 208, 210, and 212 show the same GNSS receiver antenna at three positions. Crane 201 may pause at each of these positions for a period of time. Once the data is collected at each of these positions, via a GNSS receiver, the three geographic locations of the antenna within the coordinate system are known. Various techniques may then be employed to determine the location of pivot point 220.

For example, as the antenna is rotated on the crane to various positions, the positions form the arc of a circle centered on pivot point 220. In one embodiment, a circle is described to intersect each of the three determined positions and the center of the circle is described as the location of pivot point 220. In one embodiment, solving three equations related to the circle with three variables may be employed to determine pivot point 220. This example describes using three positions of the antenna to determine the location of the pivot point. It should be appreciated that the present technology is not limited to three positions of the antenna and may employ more than three positions of the antenna to determine the location of the pivot point.

Moreover, more than one antenna may be used to determine the pivot point. If more than one antenna is employed, two separate determinations may be made of the location of the pivot point using locations from each antenna separately. The results may then be compared or averaged to determine the most accurate location of the pivot point. The present technology may also repeat the process of determining the location of the pivot point to increase the accuracy. In one embodiment, Kalman filtering and/or the method of least squares may be employed to determine the location of pivot point 220.

The coordinate system may also have a reference direction such as reference direction 222. For example, the reference direction may be true north or any other direction. Once pivot point 220 is a known geographic position in the coordinate system and with the reference direction known, it is possible to then calculate or determine the pointing angle of crane 201 in any direction. To determine the pointing angle of the crane, a current location of a GNSS receiver antenna on crane 201 is needed. A fictional line is then drawn intersecting pivot point 220 and the current location of the GNSS location antenna, this fictional line then forms an angle with the reference direction. This angle is then used to describe the pointing angle of crane 201 within the geo-referenced coordinate system or in other words, the pointing angle is described with respect to the reference direction.

To determine which direction the working arm of the crane is pointing, the mounting location of the GNSS antenna on crane 201 must be known. For example, if the GNSS receiver antenna is mounted on the working arm of the crane, then the pointing direction of the crane starts at the pivot point and points in the direction of the location of the antenna. However, if the GNSS receiver antenna is mounted on the counterweight of the crane, the pointing direction of the crane starts at the antenna and points in the direction of the pivot point. The GNSS receiver antenna may be mounted at many different locations of the crane such as the working arm, the counterweight, the cab, or the trolley. The trolley or other components of the crane may not be stationary with respect to the working arm. Therefore, if a GNSS receiver antenna is mounted to the trolley, movements of the trolley with respect of the working arm must be known to determine the location of the pivot point and/or the pointing angle of the crane.

In one embodiment, the present technology makes use of known and fixed reference points within the working environment of the crane to determine the location of the pivot point and/or the pointing angle of the crane. Such a reference point may be reference point 224. The reference point may be a surveyed location within the working environment of crane 201. The location of reference point 224 may be determined using reference receiver 226 which may be a GNSS receiver. Reference receiver 226 may be stationary and may be employed within the environment of the crane for purposes in addition to the purposes of the present technology. In one embodiment, the reference point is obtained from mobile receiver 228. Mobile receiver 228 may be a handheld device associated with the environment surrounding the crane. For example, mobile receiver 228 may be a tablet computer held by a foreman associated with the construction project the crane is being used for. Mobile receiver 228 may also be a cell phone, a smart phone, a handled device, a personal digital assistant, a netbook, a personal computer, a notebook, or any other electronic device with GNSS receiver capabilities. A computer system or a plurality of computer systems may be employed to practice the present technology. Such a computer system may be in communication with the GNSS receivers and other electronic devices used to practice the embodiments described herein. Such a computer system may have some or all of the capabilities of computer system 800 of FIG. 8.

In one embodiment, pivot point 220 is a known geographic position in the coordinate system. With a known reference point the present technology is not required to determine the location of a pivot point and may then only employ a GNSS receiver antenna mounted on the crane to determine a current location of the antenna and then determine a pointing angle of the crane within a coordinate system.

Figure 2B:
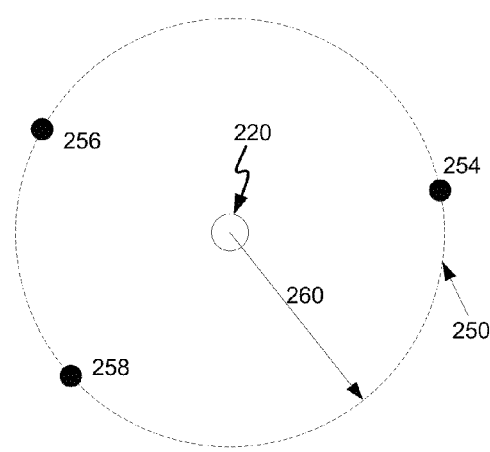
FIG. 2B is a block diagram of a pivot point of a crane and position points of receiver antennas associated with the crane in accordance with embodiments of the present technology.

With reference now to FIG. 2B, an illustration of environment 240 depicting pivot point 220. In FIG. 2B pivot point 220 is depicted in a top view as surrounded by positions 254, 256, and 258. Positions 254, 256, and 258 represent three locations of a first GNSS receiver antenna that is mounted to a crane. Each position represents a different position of the antenna at a different point in time. The antenna is communicatively coupled with a GNSS receiver capable of determining a geographic location of the antenna relative to a coordinate system at each position. Circle 250 shows that the three positions 254, 256, and 258 form a circle around pivot point 220. The present technology may employ only one GNSS receiver antenna and thus only one circle would be formed. However, in one embodiment, two or more GNSS antennas may be employed to determine the location of pivot point 220 as is depicted in FIG. 2B. Radial distance 260 may be computed as the radius of circle 250 and used to locate pivot point 220.

Figure 3A:
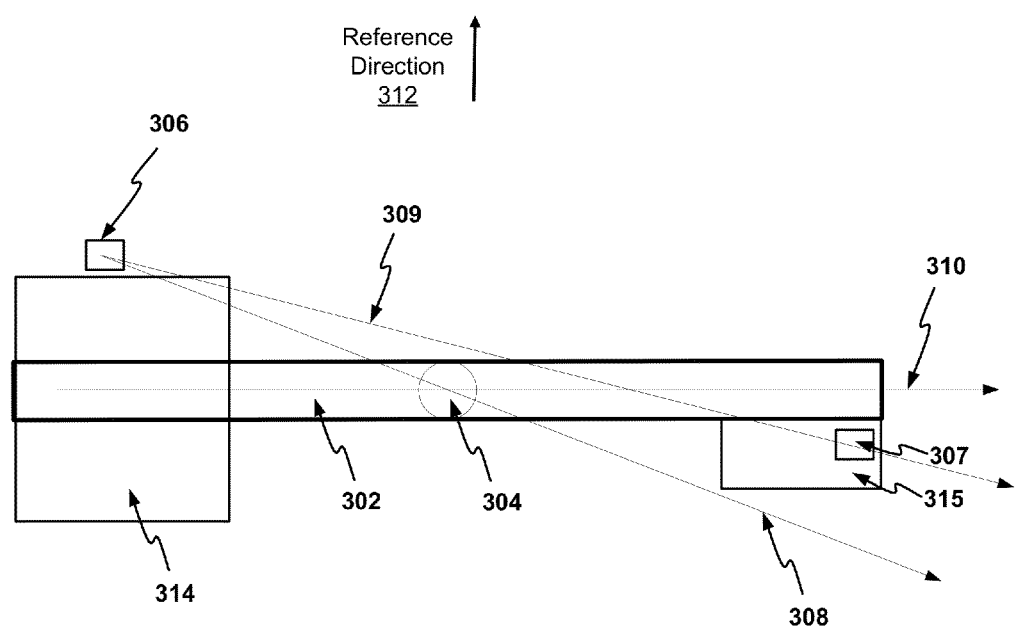
FIG. 3A is a block diagram of pointing angles of a working arm of a crane in accordance with embodiments of the present technology.

With reference now to FIG. 3A, an illustration of environment 300 depicting a top view of crane 302. It should be appreciated that crane 302 may have all the same capabilities and components of tower crane 100 of FIG. 1A, crane 160 of FIG. 1B, and crane 201 of FIG. 2A. Crane 302 comprises pivot point 304 about which crane 302 rotates during normal operations. Line 310 depicts a principal axis of crane 302 which intersects pivot point 304 and extends distally down the center portion of the working arm of crane 302. Line 310 also depicts a pointing angle of the working arm of crane 302. The pointing angle may be defined relative to reference direction 312. GNSS receiver antenna 306 depicts a GNSS receiver mounted to a side portion of the cab section of crane 302. GNSS receiver antenna 306 is depicted as being mounted to structure 314 of crane 302 offset from the principal axis or line 310. Structure 314 may be a cab or a trolley or some other portion of crane 302. Line 308 depicts a pointing angle that is defined as intersecting GNSS receiver antenna 306 and pivot point 304. However, line 308 does not depict the correct pointing angle of the working arm of crane 302 because of the offset of GNSS receiver antenna 306 relative to the principal axis.

In one embodiment, GNSS receiver antenna 306 is mounted to crane 302 along the principal axis, i.e. line 310. In such an embodiment, an offset of GNSS receiver antenna 306 does not exist and would not need to be accounted for.

The present technology is able to account for the offset of GNSS receiver antenna 306 and thus correct the pointing angle defined by line 308 such that the true pointing angle of the working arm of the crane is known. This is accomplished by knowing where the GNSS receiver antenna 306 is mounted on crane 302 and its offset relative to the principal axis. This offset may be accounted for whether the antenna is mounted to the counterweight of the crane or another component of the crane.

In one embodiment, crane 302 comprises trolley 315 with a GNSS receiver antenna 307. In an embodiment where there are two GNSS receiver antennas, such as 306 and 307, the present technology may operate to determine the pointing angle of a crane without knowing or determining the location of pivot point 304. In such an embodiment, the locations of GNSS receiver antennas 307 and 306 are determined and line 309 is depicted as a reference line. Line 309 does not point in the direction of the principal axis of the crane because GNSS receiver antennas 307 and 306 are offset from the principal axis. The present technology may employ methods and techniques that account for the offsets of GNSS receiver antennas 307 and 306 and thus compute the true pointing angle of the working arm of crane 302. For example, the distance of the offsets may be known by physically measuring the distance of the offsets and then account for them. In one embodiment, the offsets are accounted for by collecting data from multiple positions of GNSS receiver antenna 306 as it rotates and data from multiple positions of GNSS receiver antenna 307 as it moves with trolley 315 relative to the working arm. This position data can then be used with basic geometric principles to determine the offset angle of line 309 from line 308 and ultimately from line 310. This offset angle is then accounted for in determining the true point angle of the crane with respect to the reference direction 312.

Similarly, the present technology is able to correct for movements of a GNSS receiver antenna relative to the crane itself in determining the pointing angle of the crane. For example, the GNSS receiver antenna may be mounted to a trolley of the crane that is moving relative to the crane along the working arm of the crane. The GNSS receiver may be in communication with the controls of the crane and thus know the location of the trolley relative to the crane and/or the pivot point of the crane for any moment in time. The GNSS receiver may then account for such movements of the trolley relative to the crane in determining the pointing angle of the crane.

Figure 3B:
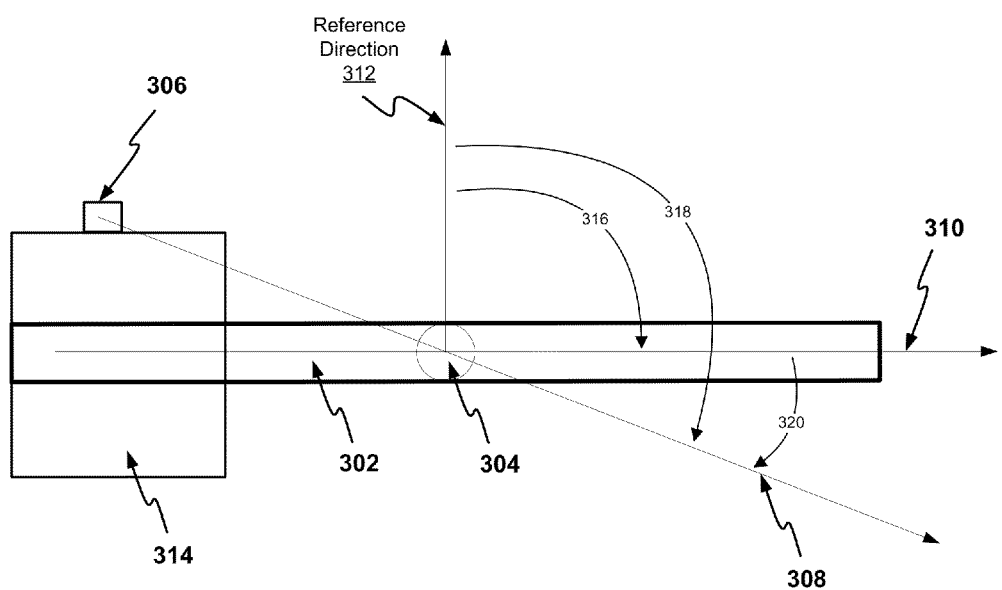
FIG. 3B is a block diagram of pointing angles of a working arm of a crane in accordance with embodiments of the present technology.

With reference now to FIG. 3B, an illustration of environment 350 depicting a top view of crane 302. It should be appreciated that crane 302 and its components have the same capabilities and components of tower crane 302 of FIG. 3A. Crane 302 is depicted as pointing in the direction indicated by line 310. This pointing direction is associated with angle 316 relative to reference direction 312. However, the present technology may measure the pointing angle of crane 302 using angle 318 relative to reference direction 312. This is due to the offset of GNSS receiver antenna 306 from the principal axis of crane 302. The present technology may account for this offset by measuring the distance that GNSS receiver antenna 306 is offset from the principal axis and then calculate angle 320. Then the offset may be accounted for by determining angle 318, subtracting angle 320 from angle 318 and thus calculate angle 316 which is the true pointing angle of crane 302 relative to reference direction 312.

With reference now to FIG. 4, an illustration of environment 400 depicting a top view of crane 402. It should be appreciated that crane 402 may have all the same capabilities and components of tower crane 100 of FIG. 1A, crane 160 of FIG. 1B, crane 201 of FIG. 2A, and crane 302 of FIG. 3A. Crane 402 is depicted with pivot point 404 and GNSS receiver antenna 408. Error ellipsoid 406 depicts an error range in which the location of GNSS receiver antenna 408 may be determined. It should be appreciated that a GNSS receiver antenna receives signals that may be subjects to a variety of errors due to a variety of factors. The signal itself may be corrupted or may suffer from external interference. Additionally, the quality of the antenna may lead to additional errors in receiving the signals. Thus, signals received at a GNSS receiver, from the antenna, may contain errors.

Such errors may lead to errors in a GNSS receiver in determining the true location or position of GNSS receiver antenna 408. These errors in the true location may then lead to errors in the true location of the pivot point 404 and ultimately the true pointing angle of the crane. The errors in determining the true location of GNSS receiver antenna 408 may be within the range defined by error ellipsoid 406. Error ellipsoid 406 is duplicated by error ellipsoid 410 depicted with two lines forming an x to show the coordinate system in which the location of GNSS receiver antenna 408 is defined. Position 412 reflects the true position of GNSS receiver antenna 408 and position 414 reflects an erroneous position of GNSS receiver antenna 408. In one embodiment, GNSS receiver antenna 408 remains stationary in true position 412 for a period of time. During that period of time GNSS receiver antenna 408 may receive a plurality if signals that may be interpreted by a GNSS receiver as a plurality of locations. Thus there may be a plurality of erroneous positions similar to position 414 within error ellipsoid 410.

In one embodiment, the GNSS receiver is in communication with the crane's controls and is aware of when the crane is stationary for a period of time. In one embodiment, a GNSS receiver may receive one data point from the antenna for every second that the antenna is stationary. Thus the GNSS receiver may interpret the plurality of signals during this period of time as all being related to one true location of GNSS receiver antenna 408. Error correction may then occur using various techniques to determine the true location of GNSS receiver antenna 408. Such error correction may vary in accuracy and may be more accurate given more data which is received the longer the crane stays stationary and the more signals are received by GNSS receiver antenna 408. The error may be referred to as a residual error and the error correction attempts to minimize such an error. The error correction may use statistical analysis and averaging to correct the errors. The error correction may employ techniques solving variables using a plurality of equations where the equations have a number of variables that is equal to or less then equal to the number of equations. In one embodiment, Kalman filtering and/or the method of least squares is employed in the error correction.

Figure 13:
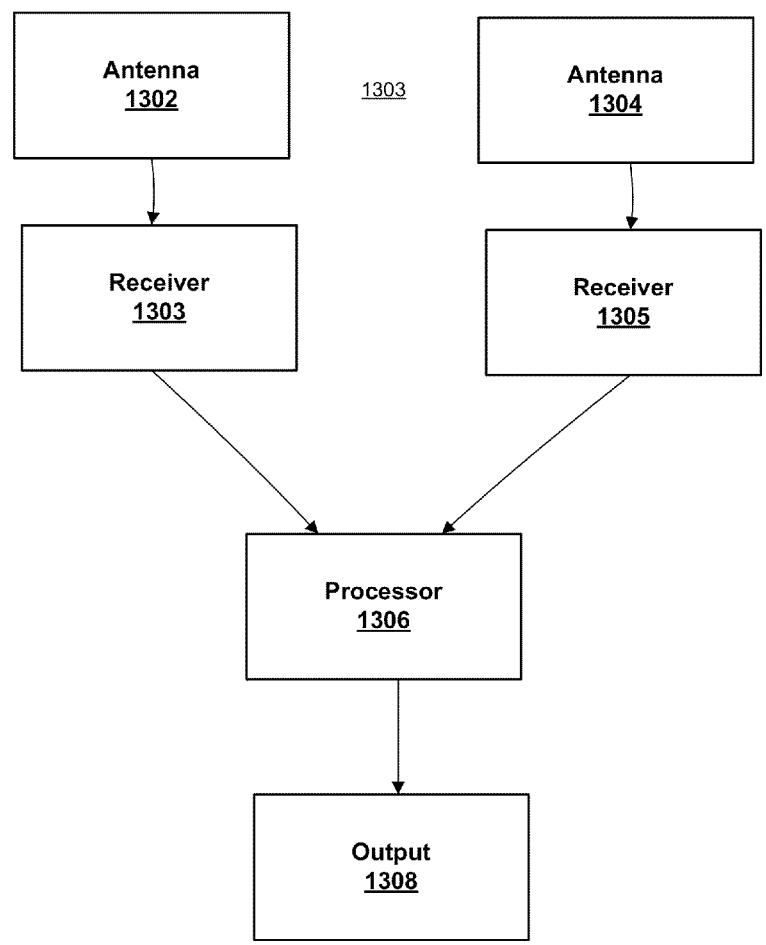
FIG. 13 is a block diagram of an example environment and system upon which embodiments of the present technology may be implemented.

With reference now to FIG. 13, an illustration of environment 1300 depicting processor 1306. Processor 1306 is a processor capable of processing data such as a central processing unit (CPU). Processor 1306 may be part of a device such as a GNSS receiver that may or may not be coupled with a crane. Processor 1306 may be a component of a computer system where the computer system may be attached to or coupled with a crane, or may be remote to a crane. Processor 1306 may be a component in a computer system where the computer system may be a cellphone, a smart phone, a personal digital assistant (PDA), a tablet computer, a personal computer, a notebook computer, a netbook computer, or the like. In one embodiment, the computer system for processor 1306 has communications capabilities via a network, a phone link, a cell phone link, WI-FI where the communications capabilities are used by processor 1306 to link to the GNSS receivers and/or antennas.

In one embodiment, environment 1300 comprises receivers 1303 and 1305 which are GNSS receivers capable of receiving data from antennas 1302 and 1304. Such data may be communicated via an electrical wire or may be sent using wireless communications. Receivers 1303 and 1305 are then able to process the data from antennas 1302 and 1304 to determine a geographical position for antennas 1302 and 1304. It should be appreciated that the more data receivers 1303 and 1305 receive from antennas 1302 and 1304 the more accurate the determined geographical position will be. In one embodiment, environment 1300 comprises only one receiver connected to both antennas 1302 and 1304. In one embodiment, antennas 1302 and 1304 are GNSS receiver antennas and are couple with or attached to locations on a crane such as the GNSS receiver antennas of FIGS. 1A and 1B. It should be appreciated that antennas 1302 and 1304 are physically separated by a distance depicted by distance 1303. Antennas 1302 and 1304 may be associated with the same GNSS receiver or may each be associated with a unique GNSS receiver.

Receivers 1303 and 1305 are able to relay the determined geographic positions of the antennas to processor 1306. In one embodiment, this is accomplished using a wired or wireless network such as WI-FI or near field communications. In one embodiment, processor 1306 is a component of a GNSS receiver.

Processor 1306 is able to process the data from receivers 1303 and 1305 and generate output 1308. Output 1308 may refer to outputs and data generated by the present technology. For example, output 1308 may be a location of a pivot point of a crane, may be a working arm pointing angle of a crane, or may be offset distances of an antenna from a principal axis of a working arm of a crane. In one embodiment, processor 1306 generates output 1308 via Kalman filtering techniques. In one embodiment, processor 1306 generates output 1308 via the method of least squares.

Figure 14:
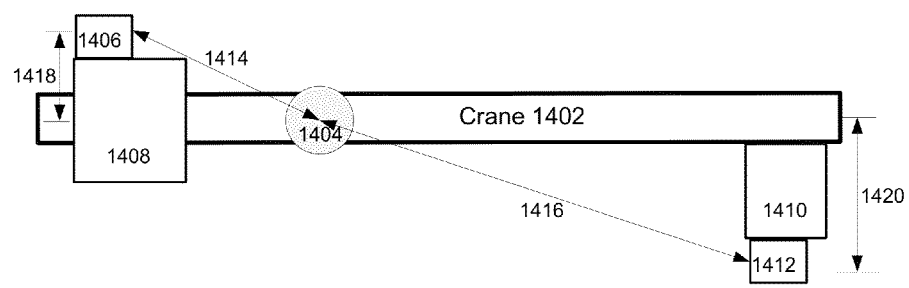
FIG. 14 is a block diagram of a crane system in accordance with embodiments of the present technology.

With reference now to FIG. 14, an illustration of environment 1400 depicting a top view of crane 1402. In one embodiment, crane 1402 is a tower crane that pivots a working arm around pivot pint 1404. It should be appreciated that crane 1402 may have all the same capabilities and components of tower crane 100 of FIG. 1A, crane 201 of FIG. 2A, and crane 302 of FIG. 3A. Environment 1400 also depicts structure 1408 coupled with GNSS receiver antenna 1406. Structure 1408 may be a cab, a counterweight or another component of crane 1402. Environment 1400 also depicts trolley 1410 coupled with GNSS receiver antenna 1412.

Distances 1414, 1416, 1418, and 1420 depict distances between components that may be useful to the present technology. Distance 1414 is the distance from GNSS receiver antenna 1406 to pivot point 1404. Distance 1416 is the distance from GNSS receiver antenna 1412 to pivot point 1404. Distance 1418 is the distance from GNSS receiver antenna 1406 to a principal axis of the working arm of crane 1402. Distance 1420 is the distance from GNSS receiver antenna 1412 to a principal axis of the working arm of crane 1402. Distances 1414, 1416, 1418, and 1420 may change during the operations of the crane as components of the crane move positions such as trolley 1410. It should be appreciated that distances 1414, 1416, 1418, and 1420 each deal with an offset of a GNSS receiver antenna from the principal axis of the working arm of crane 1402. Such distances may be physically measured or may be computed based on data accumulated from the GNSS receiver antennas. Once such distances are known, the offset of the GNSS receiver antennas may be accounted for in determining the pointing angle of the working arm of a crane.

In one embodiment, the location of pivot point 1404 is determined using techniques of the present technology described herein by rotating a GNSS receiver antenna about the pivot point and collecting data from the antenna. Once the location of pivot point 1404 is known, distances 1414 and 1416 may be calculated. In one embodiment, multiple positions of GNSS receiver antenna 1412 may be determined by collecting data from GNSS receiver antenna 1412 as it changes positions with trolley 1410 traveling along the working arm of crane 1402. These multiple positions then define a line that is parallel to the principle axis of the working arm of crane 1402. The shortest distance between such a parallel line to pivot point 1404 serves to define distance 1420. Once distance 1420 is known, the principal axis may be determined and distance 1418 may be calculated. It should be appreciated that other techniques and calculations may be performed to determine the offset distances.

Distances 1414, 1416, 1418, and 1420 are useful for determining the working arm pointing angle of a crane in two dimensions. In one embodiment, the present technology is also able to determine a three dimensional pointing angle of a crane. A three dimensional pointing angle determination may be useful for various types of cranes including mobile cranes and tower cranes that are capable of changing the elevation of the working arm. For example, the present technology may determine the three dimensional point angle of a working arm of the crane both before and after the crane changes the elevation of the working arm.

With reference now to FIG. 15, an illustration of environment 1500 depicts a side view of crane 1502 and environment 1550 depicting a top view of crane 1502. It should be appreciated that crane 1502 may have all the same capabilities and components of crane 160 of FIG. 1B. In one embodiment, crane 1502 is a level luffing crane where base 1503 is able to rotate about axis 1524 of environment 1500 or pivot point 1510 of environment 1550. Working arm 1526 may be capable of rotating about pivot point 1508 and thus move relative to base 1503. GNSS receiver antenna 1504 is depicted as being coupled to the top portion of base 1503. GNSS receiver antenna 1506 is depicted as being coupled to a distal end of working arm 1526. Axis 1528 defines an axis that intersects pivot point 1508 and is perpendicular to axis 1524. Axis 1530 intersects pivot point 1510 and is parallel to a top view of the principal axis of working arm 1526. Axis 1530 may or may not be in line with a top view of the principle axis of working arm 1526 as is depicted in environment 1550. Axis 1532 is an axis that intersects GNSS receiver antenna 1506 and is parallel to axis 1524. Therefore, working arm 1526 is capable of pointing in any number of directions in three dimensional space as it is able to rotate three hundred and sixty degrees around axis 1524 and change the vertical point angle as working arm 1526 pivots at pivot point 1508.

In one embodiment, the present technology may only determine a two dimensional pointing angle of working arm 1526. In such an embodiment, the pointing angle would be calculated with respect to a reference direction defined in the top view of crane 1502 depicted in environment 1550 in much the same manner that a two dimensional pointing angle of the working arm of a tower crane is determined. In one embodiment, a three dimensional pointing angle of working arm 1526 is determined. Distances 1512, 1514, 1516, 1518, 1520, and 1522 are useful in determining a pointing angle of working arm 1526. Distance 1512 is the distance between axis 1524 and GNSS receiver antenna 1504. Distance 1514 is the distance between axis 1532 and axis 1524. Distance 1516 is the distance between axis 1524 and pivot point 1508. Distance 1518 is the distance between axis 1528 and GNSS receiver antenna 1504. Distance 1520 is the distance between the intersection of axis 1524 with axis 1528 and GNSS receiver antenna 1506. Distance 1522 is the distance between axis 1530 and GNSS receiver antenna 1504. Distances 1512, 1514, 1516, 1518, 1520, and 1522 are each associated with the offset of a GNSS receiver antenna and a principal axis of working arm 1526.

Kalman Filtering

Figure 10:
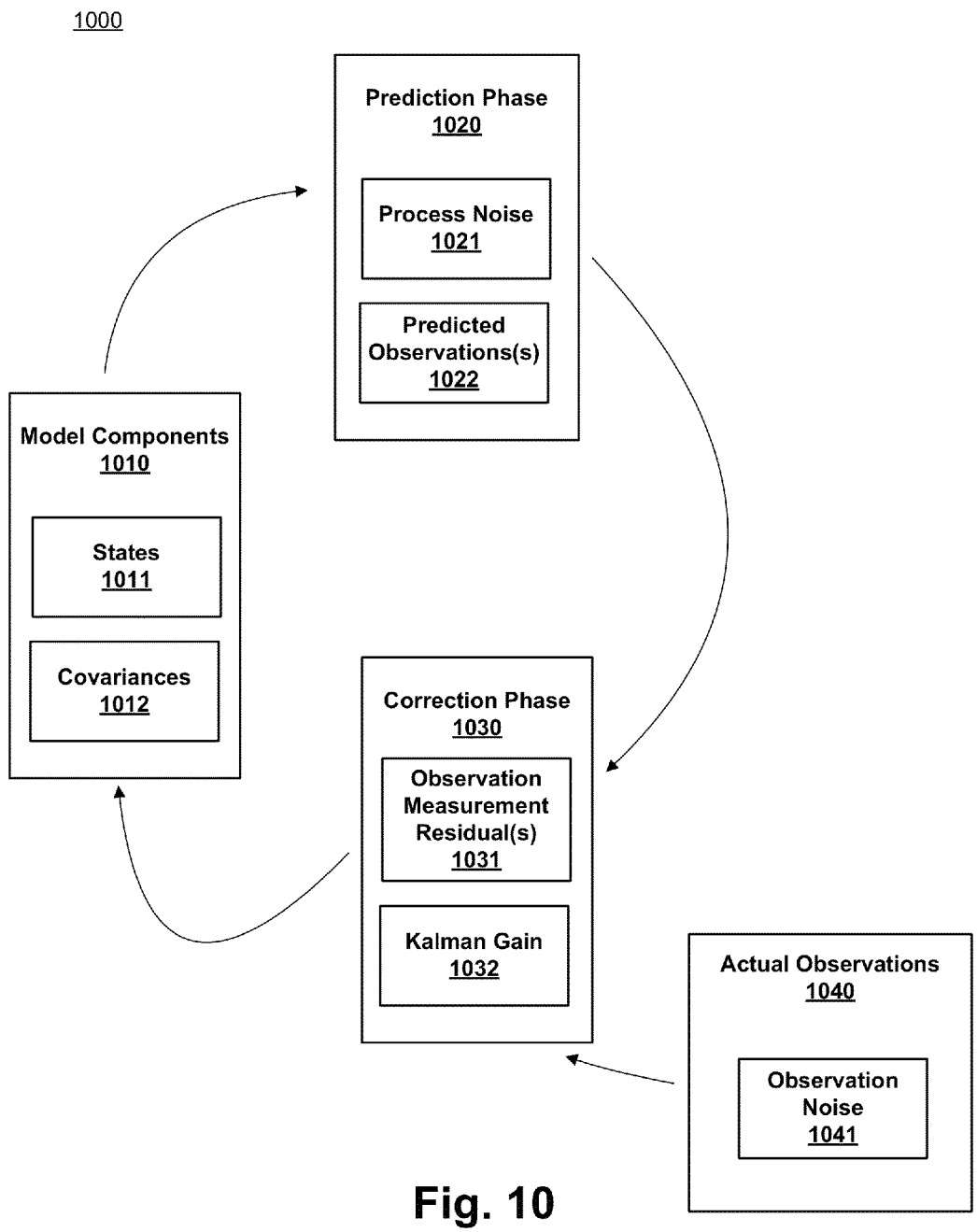
FIG. 10 is a block diagram of an example Kalman filtering process which may be used in accordance with embodiments of the present technology.

FIG. 10 depicts an example Kalman filtering process 1000, according to some embodiments. It should be appreciated that Kalman filtering is well known. As such, FIG. 10 and the associated discussion are utilized only to provide a high-level general description. Variations in the described procedures will occur during specific implementations of Kalman filtering. The extended Kalman filter and the unscented Kalman filter represent some of the variations to the basic method. Such variations are normal and expected. Generally speaking, Kalman filtering is a basic two-step predictor/corrector modeling process that is commonly used model dynamic systems. A dynamic system will often be described with a series of mathematical models. Models describing satellites in a Global Navigation Satellite System (GNSS) are one example of a dynamic system. Because the position of any satellite and/or the positions of all the satellites in a system constantly and dynamically change and the satellites output a signal that can be measured by a GNSS receiver, Kalman filtering can be used in determining the location of a GNSS antenna.

A basic Kalman filter implemented using Kalman filtering process 1000 typically has at least two major components 1010: states 1011 and covariances 112. States 111 represent variables that are used to describe a system being modeled, at a particular moment in time. Covariances 1012 are represented in a covariance matrix that describes uncertainty, or lack of confidence, of states 1011 with respect to each other at that same moment in time. Kalman filtering process 1000 also handles noise, or unpredictable variability, in the model. There are two principle types of noise, observation noise 1041 and process noise 1021. Process noise 1021 describes the uncertainty in predicting the states 1011 as a function of time. Observation noise 1041 is noise that relates to errors in the actual observation(s) 1040 (e.g., observed measurements) that are used as an input/update to Kalman filtering process 1000.

A prediction phase 1020 is the first phase of Kalman filtering process 1000. Prediction phase 1020 uses predictive models to propagate states 1011 and state covariance 1022 to the time of an actual observation(s) 1040. The propagated states 1011 are used to make predicted observation(s) 1022 for the time of actual observation(s) 1040.

A correction phase 1030 is the second phase in the Kalman filtering process 1000. During correction phase 1030, Kalman filtering process 1000 uses the difference between the predicted observation(s) 1022 and the actual observation(s) 1040 to create an observation measurement residual 1031, which may commonly be called the "measurement residual." Observation noise 1041 can be noise in actual observation(s) 1040 and/or noise that occurs in the process of taking the actual observation(s) 1040. A Kalman gain 1032 is calculated using both the covariances 1012 and the observation noise 1041. The states 1011 are then updated using the Kalman Gain 1032 multiplied by the observation measurement residual 1031. The covariances 1012 are also updated using a function related to the Kalman gain 1032; for example, in one embodiment where Kalman gain is limited to a value between 0 and 1, this function may be 1 minus the Kalman gain. This updating is sometimes referred to as the "covariance update." In some embodiments, if no actual observation 1040 is available, Kalman filtering process 1000 can simply skip correction phase 130 and update the states 1011 and covariances 1012 using only the information from prediction phase 1020, and then begin again. Using the new definitions of the states 1011 and covariances 1012, Kalman filtering process 1000 is ready to begin again and/or to be iteratively accomplished.

Equation of a Circle Passing Through Three Points

In one embodiment, the present technology determines the location of a pivot point by employing known techniques for finding the equation of a circle that passes through three known or given points. In the present technology, the three given points may be determined via data from a GNSS receiver antenna coupled with a crane gathered as the crane rotates around a pivot point. For example, one known technique substitutes the three points in the general form of circle and solve coefficients. Equation 1 shows the equation for the general form of a circle in two-dimensional space, where x and y represent any point on the circle in a Cartesian coordinate system. D, E, and F represent values to be solved for a particular circle:

$$x^2+y^2+Dx+Ey+F=0 \quad \text{EQUATION 1}$$

The three given points may be described as P, Q, and R. Each point P, Q, and R has a corresponding x,y Cartesian coordinate. P, Q, and R are each separately substituted into Equation 1 for the x and y values to create three equations. Those three equations are then solved to determine the D, E, and F values. For example, the three points may be P(2,1), Q (0,5), and R (−1,2). Upon substituting the three points into Equation 1 three separate times and solving for D, E, and F values, the resulting equation of the circle passing through P(2,1), Q (0,5), and R (−1,2) is represented by Equation 2:

$$x^2+y^2-2x-6y+5=0 \quad \text{EQUATION 2}$$

Once the equation of the circle is known, the center of the circle may be calculated and the location of the pivot point of the crane is determined. For more known techniques and further explanation, please refer to http://www.qc.edu.hk/math/Advanced%20Level/circle%20given%203%20points.htm.

Operations

FIGS. 5, 6, 7, 11 and 12 are flowcharts illustrating processes 500, 600, 700, 1100, and 1200 respectively for calibrating for crane geometries and for determining a working arm pointing angle of a crane relative to a reference direction in accordance with one embodiment of the present technology. In various embodiments, processes 500, 600, 700, 1100, and 1200 or portions thereof, are computer implemented methods that are carried out by processors and electrical components under the control of computer usable and computer executable instructions. In one embodiment, processor 1306 of FIG. 13 is employed. The computer usable and computer executable instructions reside, for example, in data storage features such as computer usable volatile and non-volatile memory and may be non-transitory. However, the computer usable and computer executable instructions may reside in any type of computer usable storage medium. Processes 500, 600 and 700 may be performed by the components of FIGS. 1A, 1B, 2A, 2B, 3A, 3B, 4, 8, 9, 10, 13, 14, and 15.

Figure 5:
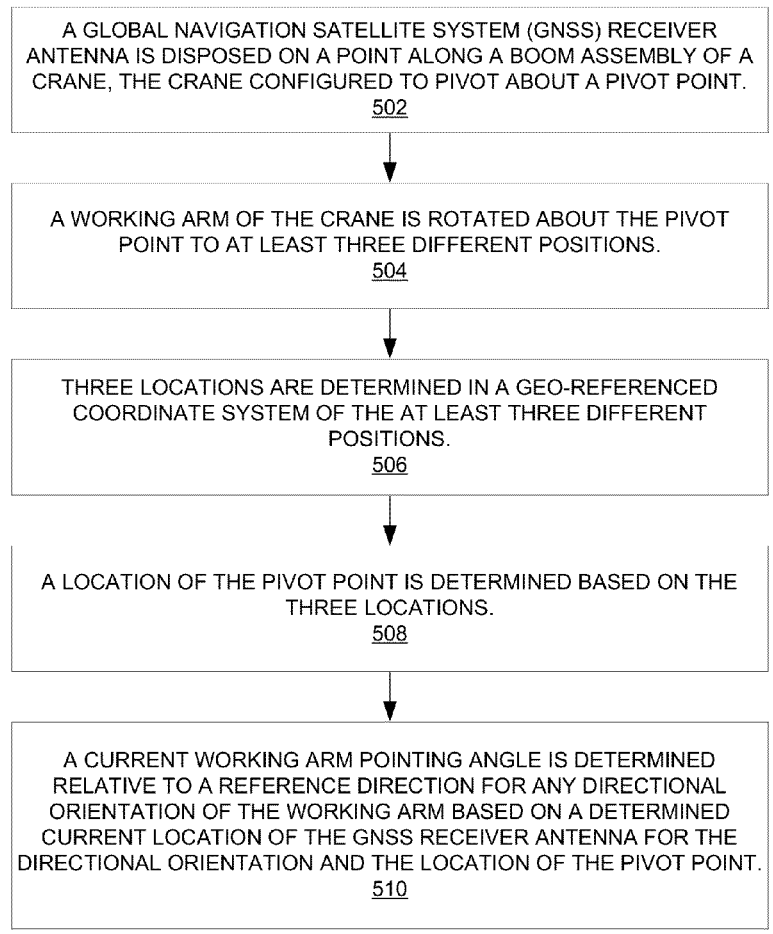
FIG. 5 is a flowchart of a method for calibrating for crane geometries and for determining a working arm pointing angle relative to a reference direction on a crane in accordance with embodiments of the present technology.

With reference to FIG. 5, process 500 is a process for calibrating for crane geometries. Such as process may be described as a self-calibrating process or an automatic process. Process 500 may include optional steps that determine a working arm point angle of the crane in addition to the calibrating.

At 502, a Global Navigation Satellite System (GNSS) receiver antenna is disposed on a point along a boom assembly of the crane, the crane configured to pivot about a pivot point. The antenna may be disposed, coupled, connected, mounted to any number of places along the crane that will move about a pivot point of the crane as the crane carries out normal operations. For example, the antenna may be disposed along a boom assembly of the crane where the boom assembly may be comprised of cab 106, counterweight 108, working arm 110, and trolley 114 of tower crane 100 of FIG. 1A. In one embodiment, the GNSS receiver antenna is mounted to the counterweight of a working arm of a crane.

The GNSS receiver antenna is also communicatively coupled with a GNSS receiver either by being physically coupled, coupled by a wire, or wireless. The GNSS receiver may or may not be disposed on the crane. The GNSS receiver may have one or more antennas associated with it. The antennas may be associated in a master slave relationship. The present technology may also incorporate a plurality of receivers each with their own antenna or plurality of antennas. A processor is capable of receiving position data from the GNSS receiver antenna or antennas and performing operations on the data. The processor may be associated with a GNSS receiver or may be part of a separate computing device. The processor may be located on or couple to the crane or may be remote to the crane. For example, Processor 1306 of FIG. 13 may be used.

For example, the crane may be tower crane 100 of FIG. 1A and the GNSS receiver antenna may be any one of 124, 126, 128, and 130 of FIG. 1A each capable of receiving signals from one or more global positioning system (GPS) satellites. Each of GNSS receiver antennas 124, 126, 128, and 130 are connected to, coupled with, or otherwise in communication with a GNSS receiver. In one embodiment, the GNSS receiver (e.g., GNSS receiver 150-1 of FIG. 1A) may be connected or coupled to tower crane 100 of FIG. 1A.

At 504, a working arm of the crane is rotated about the pivot point to at least three different positions. The crane may remain stationary at each of the three positions for a period of time to allow the antenna to receive multiple signals from GPS satellites. In one embodiment, the three different positions may be positions such as positions 208, 210 and 212 of FIG. 2A. In one embodiment, the three different positions may be positions such as positions 254, 256 and 258 of FIG. 2B. In one embodiment, the three different positions may be positions such as positions 254, 256 and 258 of FIG. 2B. It should be appreciated that the present technology is not limited to three positions, but may employ any number of positions that can be utilized to determine a pivot point.

At 506, three locations are determined in a geo-referenced coordinate system of the at least three different positions. This may be accomplished using a GNSS receiver or a computer system communicatively coupled with the GNSS receiver. For example, the computer system may be 800 of FIG. 8 coupled with a GNSS receiver of FIG. 1A such as 150-1.

At 508, a location of the pivot point is determined based on the three locations. In one embodiment, this comprises determining the location of a pivot point such as pivot point 220 of FIG. 2A. For example, the pivot point may be located at the center of a circle that intersects each of the three locations such as is depicted in FIG. 2B with pivot point 220 and circle 250 or circle 260. In one embodiment, 508 is output 1308 of FIG. 13 and is generated by processor 1306 of FIG. 13.

At 510, a current working arm pointing angle is determined relative to a reference direction for any directional orientation of the working arm based on a determined current location of the GNSS receiver antenna for the directional orientation and the location of the pivot point. The determined location of the GNSS receiver antenna may be any position the antenna is currently located in for any given moment in time. Procedure 510 may be repeated to determine a new pointing angle. The determination of the pointing angle may be accomplished by first pointing to the crane in the reference direction and then obtaining a position of the GNSS receiver antenna. This position data is then employed to determine a current pointing angle of the crane for any direction relative to the reference direction. For example, the reference direction may be reference direction 222 of FIG. 2A. In one embodiment, 510 is output 1308 of FIG. 13 and is generated by processor 1306 of FIG. 13. 510 is an optional step. If process 500 does not include 510, then process 500 only is a process for calibrating for crane geometries. However, if 510 is carried out, then process 500 is also a process for determining a working arm pointing angle of the crane.

With reference to FIG. 6, process 600 is a process for determining a working arm point angle of the crane. At 602, a Global Navigation Satellite System (GNSS) receiver antenna is provided and disposed on a point along a boom assembly of a crane. The antenna may be disposed, coupled, connected, mounted to any number of places along the crane that will move about a pivot point of the crane as the crane carries out normal operations. The GNSS receiver antenna is also communicatively coupled with a GNSS receiver either by being physically coupled, coupled by a wire, or wireless. The GNSS receiver may or may not be disposed on the crane. The GNSS receiver may have one or more antennas associated with it. The antennas may be associated in a master slave relationship. The present technology may also incorporate a plurality of receivers each with their own antenna or plurality of antennas.

For example, the crane may be tower crane 100 of FIG. 1A and the GNSS receiver antenna may be any one of 124, 126, 128, and 130 of FIG. 1A each capable of receiving signals from one or more global positioning system (GPS) satellites. Each of GNSS receiver antennas 124, 126, 128, and 130 are connected to, coupled with, or otherwise in communication with a GNSS receiver. In one embodiment, the GNSS receiver (e.g., GNSS receiver 150-1 of FIG. 1A) may be connected or coupled to tower crane 100 of FIG. 1A.

At 604, at least one known and fixed reference point is provided in a geo-coordinate reference system related to the reference system utilized by a GNSS receiver coupled with the GNSS receiver antenna, the known fixed reference point proximate a working environment of the crane. The known and fixed reference point may be a pivot point of the crane, a surveyed location in the working environment of the crane, or may be information from a second GNSS receiver located within the working environment of the crane where the crane is operating as the know and fixed reference point. In one embodiment, the known and fixed reference point is reference point 224 of FIG. 2A. The known and fixed reference point may also be obtained by reference receiver 226 or mobile receiver 228 of FIG. 2A. In one embodiment the known and fixed reference point is pivot point 220 of FIG. 2A or 2B. In one embodiment, the known and fixed reference point is defined as proximate to the working environment of the crane if it is observable by the crane operator.

At 606, the working arm is rotated around a pivot point of the crane to a specific pointing angle. In one embodiment the pivot point is pivot point 220 of FIG. 2A or 2B. The specific point angle may be reference direction 222 of FIG. 2A or some other direction with respect to reference direction 222.

At 608, the GNSS receiver antenna is used while at the specific pointing angle to determine a reference point and the location of the reference point is used to determine a working arm pointing angle relative to a reference direction. The reference point may be the current location of the GNSS receiver and antenna and the reference direction may be reference direction 222 of FIG. 2A. In one embodiment, 608 is output 1308 of FIG. 13 and is generated by processor 1306 of FIG. 13.

Figure 7:
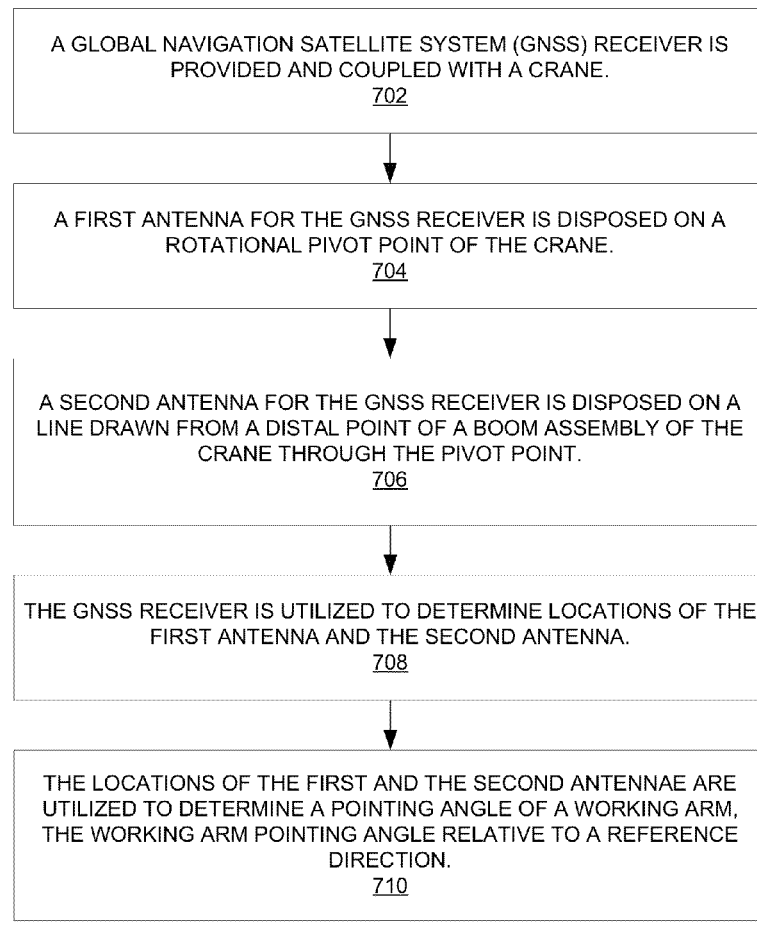
FIG. 7 is a flowchart of a method for determining a working arm pointing angle relative to a reference direction on a crane in accordance with embodiments of the present technology.

With reference to FIG. 7, process 700 is a process for determining a working arm point angle of the crane. At 702, a Global Navigation Satellite System (GNSS) receiver is provided and coupled with a crane. The GNSS receiver may or may not be disposed on the crane. The GNSS receiver may have one or more antennas associated with it. The GNSS receiver is also communicatively coupled with one or more GNSS receiver antennas either by being physically coupled, coupled by a wire, or wireless. The antennas may be associated in a master slave relationship. The present technology may also incorporate a plurality of receivers each with their own antenna or plurality of antennas.

At 704, a first antenna for the GNSS receiver is disposed on a rotational pivot point of the crane. The antenna may be disposed, coupled, connected, mounted to any number of places along the crane that will move about a pivot point of the crane as the crane carries out normal operations. In one embodiment, the GNSS receiver antenna is mounted to the counterweight of a working arm of a crane.

For example, the crane may be tower crane 100 of FIG. 1A and the GNSS receiver antenna may be any one of 124, 126, 128, and 130 of FIG. 1A each capable of receiving signals from one or more global positioning system (GPS) satellites. Each of GNSS receiver antennas 124, 126, 128, and 130 are connected to, coupled with, or otherwise in communication with a GNSS receiver. In one embodiment, the GNSS receiver (e.g., GNSS receiver 150-1 of FIG. 1A) may be connected or coupled to tower crane 100 of FIG. 1A.

At 706, a second antenna for the GNSS receiver is disposed on a line drawn from a distal point of a boom assembly of the crane through the pivot point. In one embodiment, the second antenna is disposed on the counterweight of the crane. In one embodiment, the second antenna is disposed on the working arm of the crane. The GNSS receiver antenna may be any one of 124, 126, 128, and 130 of FIG. 1A At 708, the GNSS receiver is utilized to determine locations of the first antenna and the second antenna. For example, the GNSS receiver may be 150-1 of FIG. 1A. In one embodiment, GNSS receiver ceases to receive signals from the first antenna after determining the location of the first antenna. In one embodiment, 708 is output 1308 of FIG. 13 and is generated by processor 1306 of FIG. 13.

At 710, the locations of the first and the second antennae are utilized to determine a working arm pointing angle relative to a reference direction. For example, the reference direction may be reference direction 222 of FIG. 2A. In one embodiment, 710 is output 1308 of FIG. 13 and is generated by processor 1306 of FIG. 13.

Figure 11:
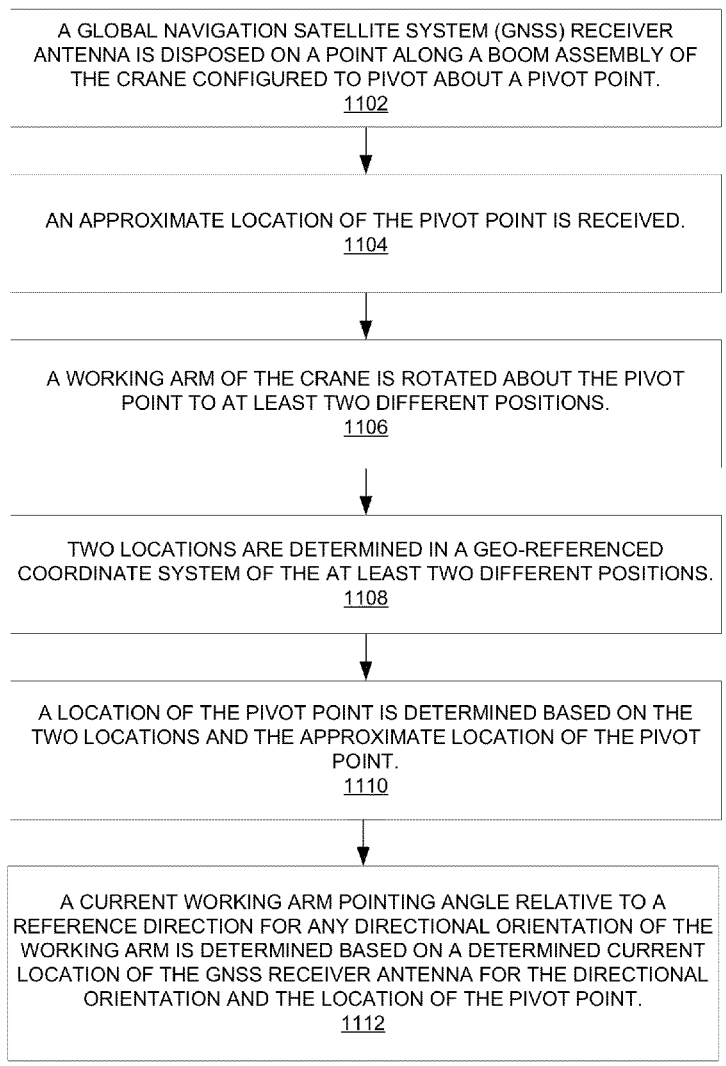
FIG. 11 is a flowchart of a method for calibrating for crane geometries and for determining a working arm pointing angle relative to a reference direction on a crane in accordance with embodiments of the present technology.

With reference to FIG. 11, process 1100 is a process for calibrating a crane for crane geometry. At 1102, a Global Navigation Satellite System (GNSS) receiver antenna is disposed on a point along a boom assembly of the crane configured to pivot about a pivot point. The antenna may be disposed, coupled, connected, mounted to any number of places along the crane that will move about a pivot point of the crane as the crane carries out normal operations. The GNSS receiver antenna is also communicatively coupled with a GNSS receiver either by being physically coupled, coupled by a wire, or wireless. The GNSS receiver may or may not be disposed on the crane. The GNSS receiver may have one or more antennas associated with it. The antennas may be associated in a master slave relationship. The present technology may also incorporate a plurality of receivers each with their own antenna or plurality of antennas.

For example, the crane may be tower crane 100 of FIG. 1A and the GNSS receiver antenna may be any one of 124, 126, 128, and 130 of FIG. 1A each capable of receiving signals from one or more global positioning system (GPS) satellites. Each of GNSS receiver antennas 124, 126, 128, and 130 are connected to, coupled with, or otherwise in communication with a GNSS receiver. In one embodiment, the GNSS receiver (e.g., GNSS receiver 150-1 of FIG. 1A) may be connected or coupled to tower crane 100 of FIG. 1A.

At 1104, an approximate location of the pivot point is received. Such an approximate location may be known based on the location of the crane. In one embodiment, a processor may know the radius of a working arm or boom of the crane and thus know that the pivot point must fall within a circle comprising such a radius where the circle is centered on a location received from the GNSS receiver antenna.

At 1106, a working arm of the crane is rotated about the pivot point to at least two different positions.

At 1108, two locations are determined in a geo-referenced coordinate system of the at least two different positions. With two known locations, each location may described as a point surrounded by a circle where each circle has a radius that is equal to the radius of the working arm or boom of the crane. The portions where the two circles overlap may then be described as the approximate location of the pivot point.

At 1110, a location of the pivot point is determined based on the two locations and the approximate location of the pivot point. In one embodiment, 1110 is output 1308 of FIG. 13 and is generated by processor 1306 of FIG. 13.

At 1112, a current working arm pointing angle relative to a reference direction for any directional orientation of the working arm is determined based on a determined current location of the GNSS receiver antenna for the directional orientation and the location of the pivot point. In one embodiment, 1112 is output 1308 of FIG. 13 and is generated by processor 1306 of FIG. 13. 1112 is an optional step. If process 1100 does not include 1112, then process 1100 is only a process for calibrating for crane geometries. However, if 1112 is carried out, then process 1100 is also a process for determining a working arm pointing angle of the crane.

Figure 12:
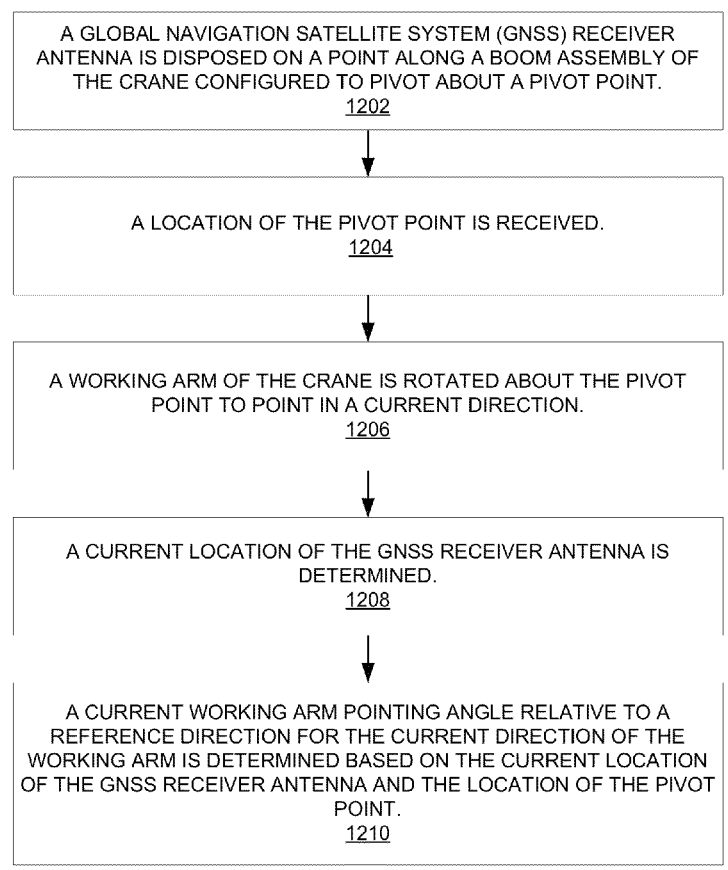
FIG. 12 is a flowchart of a method for determining a working arm pointing angle relative to a reference direction on a crane in accordance with embodiments of the present technology.

With reference to FIG. 12, process 1200 is a process for determining a working arm point angle of the crane. At 1202, a Global Navigation Satellite System (GNSS) receiver antenna is disposed on a point along a boom assembly of the crane configured to pivot about a pivot point. The antenna may be disposed, coupled, connected, mounted to any number of places along the crane that will move about a pivot point of the crane as the crane carries out normal operations. The GNSS receiver antenna is also communicatively coupled with a GNSS receiver either by being physically coupled, coupled by a wire, or wireless. The GNSS receiver may or may not be disposed on the crane. The GNSS receiver may have one or more antennas associated with it. The antennas may be associated in a master slave relationship. The present technology may also incorporate a plurality of receivers each with their own antenna or plurality of antennas.

For example, the crane may be a tower crane 100 of FIG. 1A and the GNSS receiver antenna may be any one of 124, 126, 128, and 130 of FIG. 1A each capable of receiving signals from one or more global positioning system (GPS) satellites. Each of GNSS receiver antennas 124, 126, 128, and 130 are connected to, coupled with, or otherwise in communication with a GNSS receiver. In one embodiment, the GNSS receiver (e.g., GNSS receiver 150-1 of FIG. 1A) may be connected or coupled to tower crane 100 of FIG. 1A.

At 1204, a location of the pivot point is received. In one embodiment, the location of the pivot point is determined using process 500. In one embodiment, the location of the pivot point is determined or known using any technique. In one embodiment, the location of the pivot point is determined by data from a GNSS receiver antenna located on the pivot point.

At 1206, a working arm of the crane is rotated about the pivot point to point in a current direction.

At 1208, a current location of the GNSS receiver antenna is determined. In one embodiment, 1208 is output 1308 of FIG. 13 and is generated by processor 1306 of FIG. 13.

At 1210, a current working arm pointing angle relative to a reference direction for the current direction of the working arm is determined based on the current location of the GNSS receiver antenna and the location of the pivot point. In one embodiment, 1210 is output 1308 of FIG. 13 and is generated by processor 1306 of FIG. 13. It should be appreciated that the process 1200 may be repeated any number of times or on a periodic basis to repeatedly determine the working arm pointing angle of the crane at various different times.

Computer System

Figure 8:
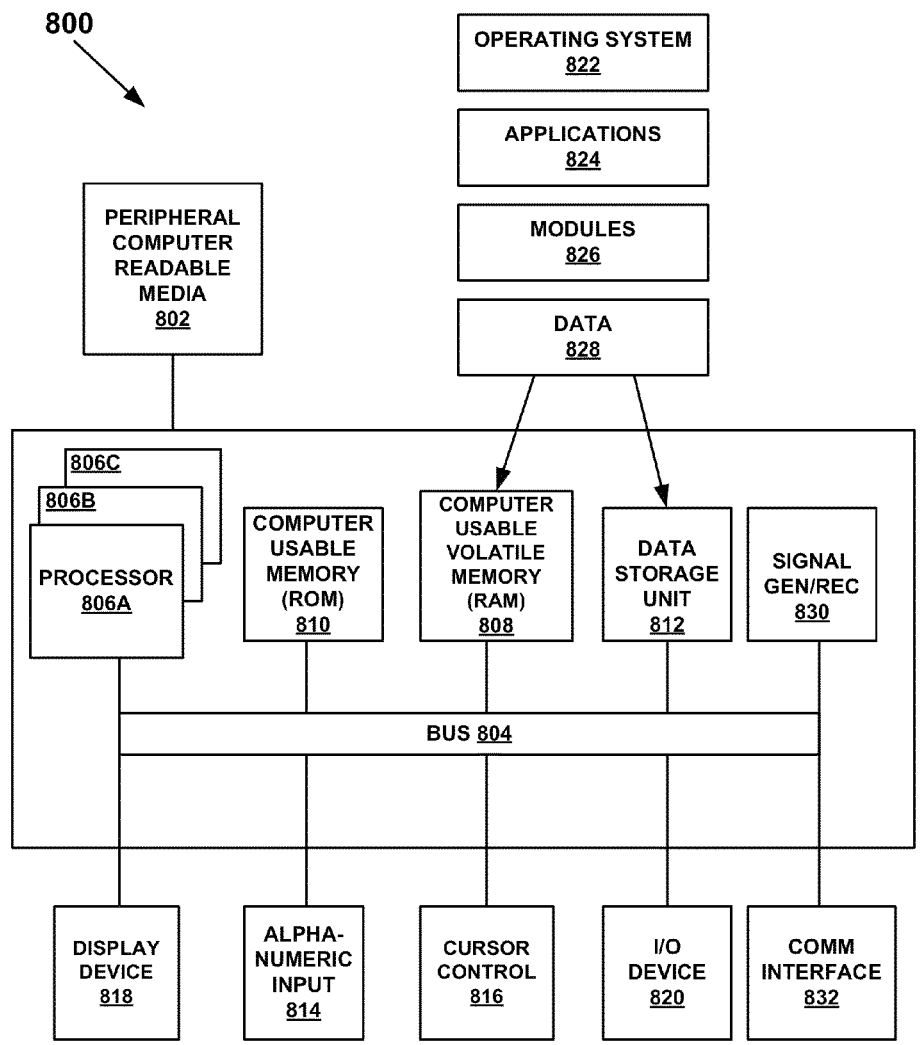
FIG. 8 is a block diagram of an example computer system upon which embodiments of the present technology may be implemented.

With reference now to FIG. 8, portions of the technology for providing a communication composed of computer-readable and computer-executable instructions that reside, for example, in non-transitory computer-usable storage media of a computer system. That is, FIG. 8 illustrates one example of a type of computer that can be used to implement embodiments of the present technology. FIG. 8 represents a system or components that may be used in conjunction with aspects of the present technology. In one embodiment, some or all of the components of FIGS. 1-4 may be combined with some or all of the components of FIG. 8 to practice the present technology.

FIG. 8 illustrates an example computer system 800 used in accordance with embodiments of the present technology. It is appreciated that system 800 of FIG. 8 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 8, computer system 800 of FIG. 8 is well adapted to having peripheral computer readable media 802 such as, for example, a floppy disk, a compact disc, and the like coupled thereto.

System 800 of FIG. 8 includes an address/data bus 804 for communicating information, and a processor 806A coupled to bus 804 for processing information and instructions. As depicted in FIG. 8, system 800 is also well suited to a multi-processor environment in which a plurality of processors 806A, 806B, and 806C are present. Conversely, system 800 is also well suited to having a single processor such as, for example, processor 806A. Processors 806A, 806B, and 806C may be any of various types of microprocessors. System 800 also includes data storage features such as a computer usable volatile memory 808, e.g. random access memory (RAM), coupled to bus 804 for storing information and instructions for processors 806A, 806B, and 806C.

System 800 also includes computer usable non-volatile memory 810, e.g. read only memory (ROM), coupled to bus 804 for storing static information and instructions for processors 806A, 806B, and 806C. Also present in system 800 is a data storage unit 812 (e.g., a magnetic or optical disk and disk drive) coupled to bus 804 for storing information and instructions. System 800 also includes an optional alpha-numeric input device 814 including alphanumeric and function keys coupled to bus 804 for communicating information and command selections to processor 806A or processors 806A, 806B, and 806C. System 800 also includes an optional cursor control device 816 coupled to bus 804 for communicating user input information and command selections to processor 806A or processors 806A, 806B, and 806C. System 800 of the present embodiment also includes an optional display device 818 coupled to bus 804 for displaying information.

Referring still to FIG. 8, optional display device 818 of FIG. 8 may be a liquid crystal device, cathode ray tube, plasma display device, light emitting diode (LED) light-bar, or other display device suitable for creating graphic images and alpha-numeric characters recognizable to a user. Optional cursor control device 816 allows the computer user to dynamically signal the movement of a visible symbol (cursor) on a display screen of display device 818. Many implementations of cursor control device 816 are known in the art including a trackball, mouse, touch pad, joystick or special keys on alpha-numeric input device 814 capable of signaling movement of a given direction or manner of displacement. Alternatively, it will be appreciated that a cursor can be directed and/or activated via input from alpha-numeric input device 814 using special keys and key sequence commands.

System 800 is also well suited to having a cursor directed by other means such as, for example, voice commands. System 800 also includes an I/O device 820 for coupling system 800 with external entities. For example, in one embodiment, I/O device 820 is a modem for enabling wired or wireless communications between system 800 and an external network such as, but not limited to, the Internet. A more detailed discussion of the present technology is found below.

Referring still to FIG. 8, various other components are depicted for system 800. Specifically, when present, an operating system 822, applications 824, modules 826, and data 828 are shown as typically residing in one or some combination of computer usable volatile memory 808, e.g. random access memory (RAM), and data storage unit 812. However, it is appreciated that in some embodiments, operating system 822 may be stored in other locations such as on a network or on a flash drive; and that further, operating system 822 may be accessed from a remote location via, for example, a coupling to the internet. In one embodiment, the present technology, for example, is stored as an application 824 or module 826 in memory locations within RAM 808 and memory areas within data storage unit 812. The present technology may be applied to one or more elements of described system 800.

System 800 also includes one or more signal generating and receiving device(s) 830 coupled with bus 804 for enabling system 800 to interface with other electronic devices and computer systems. Signal generating and receiving device(s) 830 of the present embodiment may include wired serial adaptors, modems, and network adaptors, wireless modems, and wireless network adaptors, and other such communication technology. The signal generating and receiving device(s) 830 may work in conjunction with one or more communication interface(s) 832 for coupling information to and/or from system 800. Communication interface 832 may include a serial port, parallel port, Universal Serial Bus (USB), Ethernet port, antenna, or other input/output interface. Communication interface 832 may physically, electrically, optically, or wirelessly (e.g. via radio frequency) couple system 800 with another device, such as a cellular telephone, radio, or computer system.

The computing system 800 is only one example of a suitable computing environment and is not intended to suggest any limitation as to the scope of use or functionality of the present technology. Neither should the computing environment 800 be interpreted as having any dependency or requirement relating to any one or combination of components illustrated in the example computing system 800.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

GNSS Receiver

With reference now to FIG. 9, a block diagram is shown of an embodiment of an example GNSS receiver which may be used in accordance with various embodiments described herein. In particular, FIG. 9 illustrates a block diagram of a GNSS receiver in the form of a general purpose GPS receiver 980 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s) including, but not limited to, GPS signal(s), Glonass signal(s), Galileo signal(s), and BeiDou signal(s).

The technology is also well suited for use with regional navigation satellite system signal(s) including, but not limited to, Omnistar signal(s), StarFire signal(s), Centerpoint signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

In one embodiment, the present technology may be utilized by GNSS receivers which access the L1 signals alone, or in combination with the L2 signal(s). A more detailed discussion of the function of a receiver such as GPS receiver 980 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 980 of FIG. 9.

In FIG. 9, received L1 and L2 signal is generated by at least one GPS satellite. Each GPS satellite generates different signal L1 and L2 signals and they are processed by different digital channel processors 952 which operate in the same way as one another. FIG. 9 shows GPS signals (L1=1575.42 MHz, L2=1227.60 MHz) entering GPS receiver 980 through a dual frequency antenna 901. Antenna 901 may be a magnetically mountable model commercially available from Trimble® Navigation of Sunnyvale, Calif., 94085. Master oscillator 948 provides the reference oscillator which drives all other clocks in the system. Frequency synthesizer 938 takes the output of master oscillator 948 and generates important clock and local oscillator frequencies used throughout the system. For example, in one embodiment frequency synthesizer 938 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 934 performs filtering and low noise amplification of both L1 and L2 signals. The noise figure of GPS receiver 980 is dictated by the performance of the filter/LNA combination. The downconverter 936 mixes both L1 and L2 signals in frequency down to approximately 175 MHz and outputs the analogue L1 and L2 signals into an IF (intermediate frequency) processor 30. IF processor 950 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 952 inputs the digitally sampled L1 and L2 inphase and quadrature signals. All digital channel processors 952 are typically identical by design and typically operate on identical input samples. Each digital channel processor 952 is designed to digitally track the L1 and L2 signals produced by one satellite by tracking code and carrier signals and to form code and carrier phase measurements in conjunction with the microprocessor system 954. One digital channel processor 952 is capable of tracking one satellite in both L1 and L2 channels.

Microprocessor system 954 is a general purpose computing device which facilitates tracking and measurements processes, providing pseudorange and carrier phase measurements for a navigation processor 958. In one embodiment, microprocessor system 954 provides signals to control the operation of one or more digital channel processors 952. Navigation processor 958 performs the higher level function of combining measurements in such a way as to produce position, velocity and time information for the differential and surveying functions. Storage 960 is coupled with navigation processor 958 and microprocessor system 954. It is appreciated that storage 960 may comprise a volatile or nonvolatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Differential GPS

Embodiments described herein can use Differential GPS to determine position information with respect to a jib of the tower crane. Differential GPS (DGPS) utilizes a reference station which is located at a surveyed position to gather data and deduce corrections for the various error contributions which reduce the precision of determining a position fix. For example, as the GNSS signals pass through the ionosphere and troposphere, propagation delays may occur. Other factors which may reduce the precision of determining a position fix may include satellite clock errors, GNSS receiver clock errors, and satellite position errors (ephemeredes).

The reference station receives essentially the same GNSS signals as rovers which may also be operating in the area. However, instead of using the timing signals from the GNSS satellites to calculate its position, it uses its known position to calculate errors in the respective satellite measurements. The reference station satellite errors, or corrections, are then broadcast to rover GNSS equipment working in the vicinity of the reference station. The rover GNSS receiver applies the reference station satellite corrections to its respective satellite measurements and in so doing, removes many systematic satellite and atmospheric errors. As a result, the rover GNSS receiver position estimates are more precisely determined. Alternatively, the reference station corrections may be stored for later retrieval and correction via post-processing techniques.

Real Time Kinematic System

An improvement to DGPS methods is referred to as Real-time Kinematic (RTK). The present technology employs RTK, however, in one embodiment, the working angle of the crane is determined without using RTK. As in the DGPS method, the RTK method, utilizes a reference station located at determined or surveyed point. The reference station collects data from the same set of satellites in view by the rovers in the area. Measurements of GNSS signal errors taken at the reference station (e.g., dual-frequency code and carrier phase signal errors) and broadcast to one or more rovers working in the area. The rover(s) combine the reference station data with locally collected carrier phase and pseudo-range measurements to estimate carrier-phase ambiguities and precise rover position. The RTK method is different from DGPS methods primarily because RTK is based on precise GNSS carrier phase measurements. DGPS methods are typically based on pseudo-range measurements. The accuracy of DGPS methods is typically decimeter-to meter-level; whereas RTK techniques typically deliver cm-level position accuracy.

RTK rovers are typically limited to operating within 70 km of a single reference station, Atmospheric errors such as ionospheric and tropospheric errors become significant beyond 70 km. "Network RTK" or "Virtual Reference Station" (VRS) techniques have been developed to address some of the limitations of single-reference station RTK methods.
Network RTK Network RTK typically uses three or more GNSS reference stations to collect GNSS data and extract spatial and temporal information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network. The control center computer then applies a process which interpolates the atmospheric and/or satellite ephemeris errors at any given point within the network coverage area. Synthetic pseudo-range and carrier phase observations for satellites in view are then generated for a "virtual reference station" nearby the rover(s).

The rover is configured to couple a data-capable cellular telephone to its internal signal processing system. The surveyor operating the rover determines that he needs to activate the VRS process and initiates a call to the control center to make a connection with the processing computer. The rover sends its approximate position, based on raw GNSS data from the satellites in view without any corrections, to the control center. Typically, this approximate position is accurate to approximately 4-7 meters. The surveyor then requests a set of "modeled observables" for the specific location of the rover. The control center performs a series of calculations and creates a set of correction models that provide the rover with the means to estimate the ionospheric path delay from each satellite in view from the rover, and to take into account other error contributions for those same satellites at the current instant in time for the rover's location. In other words, the corrections for a specific rover at a specific location are determined on command by the central processor at the control center and a corrected data stream is sent from the control center to the rover. Alternatively, the control center may instead send atmospheric and ephemeris corrections to the rover which then uses that information to determine its position more precisely.

These corrections are now sufficiently precise that the high performance position accuracy standard of 2-3 cm may be determined, in real time, for any arbitrary rover position. Thus the GNSS rover's raw GNSS data fix can be corrected to a degree that makes it behave as if it were a surveyed reference location; hence the terminology "virtual reference station." An example of a network RTK system which may be utilized in accordance with embodiments described herein is described in U.S. Pat. No. 5,899,957, entitled "Carrier Phase Differential GPS Corrections Network," by Peter Loomis, assigned to the assignee of the present patent application and incorporated as reference herein in its entirety.

The Virtual Reference Station method extends the allowable distance from any reference station to the rovers. Reference stations may now be located hundreds of kilometers apart, and corrections can be generated for any point within an area surrounded by reference stations.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for calibrating a crane for crane geometry, said method comprising:
   disposing a Global Navigation Satellite System (GNSS) receiver antenna on a point along a boom assembly of said crane configured to pivot about a pivot point;
   rotating a working arm of said crane about said pivot point to at least three different positions;
   determining three locations in a geo-referenced coordinate system of said at least three different positions; and
   determining a location of said pivot point based on said three locations.

2. The method as recited claim 1, wherein said point along said boom assembly for said GNSS receiver antenna is selected from the group of points consisting of: on a counterweight of a working arm of said crane, a cab of said crane, a working arm of said crane, a boom of said crane, and a trolley of said crane.

3. The method as recited in claim 1, wherein said disposing said GNSS receiver antenna comprises:
   disposing a plurality of GNSS receiver antennas and said determining said location of said pivot point is further based on said plurality of GNSS receiver antennas.

4. The method as recited in claim 3, wherein said plurality of GNSS receiver antennas are connected to a single GNSS receiver in a master slave relationship.

5. The method as recited in claim 3, wherein said plurality of GNSS receiver antennas are each connected to a separate GNSS receiver.

6. The method as recited in claim 1, wherein said crane remains stationary for a period of time at each of said three different positions such that a GNSS receiver may receive multiple data points from said GNSS receiver antenna for each of said three different positions.

7. The method as recited in claim 1, wherein said determining said three locations and determining said pivot point employs a method of least squares.

8. The method as recited in claim 1, wherein said determining said three locations and determining said pivot point employs a Kalman filter.

9. The method as recited in claim 1, wherein said point along said crane for said GNSS receiver antenna is along a principal axis of said crane.

10. The method as recited in claim 1, wherein said point along said crane for said GNSS receiver antenna is offset from a principal axis of said crane and wherein said determining said three locations and determining said pivot point accounts for said offset.

11. The method as recited in claim 10, wherein said offset is accounted for by pointing said working arm of said crane in a reference direction, then point said GNSS receiver antenna in said reference direction and measuring a difference in position of said GNSS receiver antenna.

12. The method as recited in claim 1, wherein said GNSS receiver antenna is connected to a GNSS receiver coupled with said crane.

13. The method as recited in claim 1, wherein said GNSS receiver antenna is remotely connected to a GNSS receiver that is not coupled with said crane.

14. The method as recited in claim 1, said method further comprising:
determining a second location of said pivot point after said mobile crane has changed an elevation, wherein said second location is determined based on a second set of three locations of said GNSS receiver antenna.

15. The method as recited in claim 1, wherein said crane is a mobile crane, said method further comprising:
determining a second location of said pivot point after said mobile crane has moved a position, wherein said second location is determined based on a second set of three locations of said GNSS receiver antenna.

16. The method as recited in claim 1, wherein said determining said location of said pivot point is determined in a two dimensional frame of reference.

17. The method as recited in claim 1, wherein said determining said location of said pivot point is determined in a three dimensional frame of reference.

18. The method as recited in claim 1, wherein said crane is selected from the group of cranes consisting of: a tower crane, a luffing crane, a level luffing crane, a fixed crane, a mobile crane, a self-erecting crane, a crawler crane, and a telescopic crane.

19. The method as recited in claim 1, further comprising:
determining a current working arm pointing angle relative to a reference direction for a particular directional orientation of said working arm based on both a determined current location of said GNSS receiver antenna for said particular directional orientation and said location of said pivot point.

20. A method for calibrating a crane for crane geometry, said method comprising:
disposing a Global Navigation Satellite System (GNSS) receiver antenna on a cab of said crane, said crane configured to pivot about a pivot point;
rotating a working arm of said crane about said pivot point to at least three different positions;
determining three locations in a geo-referenced coordinate system of said at least three different positions; and
determining a location of said pivot point based on said three locations.

21. A non-transitory computer-usable storage medium having instructions embodied therein that when executed cause a computer system to perform a method for calibrating a crane for crane geometry, said method comprising:
receiving data from a Global Navigation Satellite System (GNSS) receiver antenna for at least three different positions, wherein said GNSS receiver antenna positioned on a point along a boom assembly of said crane configured to pivot about a pivot point;
determining three locations in a geo-referenced coordinate system of said at least three different positions; and
determining a location of said pivot point based on said three locations.

22. The non-transitory computer-usable storage medium as recited in claim 21, further comprising:
determining a current working arm pointing angle relative to a reference direction for a particular directional orientation of a working arm of said crane based on both a determined current location of said GNSS receiver antenna for said particular directional orientation and said location of the pivot point.

23. A crane apparatus comprising:
a crane comprising:
a boom assembly; and
a working arm;
a Global Navigation Satellite System (GNSS) receiver antenna disposed on a point along said boom assembly of said crane configured to pivot about a pivot point; and
a processor for:
receiving data from said GNSS receiver antenna for at least three different positions of said GNSS receiver antenna;
determining three locations in a geo-referenced coordinate system of said at least three different positions; and
determining a location of said pivot point based on said three locations.

24. The crane apparatus as recited in claim 23 wherein said processor is located in a position selected from the group of positions consisting of: a position associated with said crane, and a position remote to said crane.

25. The crane apparatus as recited in claim 23 wherein said processor is further for:
determining a current working arm pointing angle relative to a reference direction for a particular directional orientation of said working arm based on both a determined current location of said GNSS receiver antenna for said particular directional orientation and said location of the pivot point.

26. A method for calibrating a crane for crane geometry, said method comprising:
disposing a Global Navigation Satellite System (GNSS) receiver antenna on a point along a boom assembly of said crane configured to pivot about a pivot point;
receiving an approximate location of said pivot point;
rotating a working arm of said crane about said pivot point to at least two different positions;
determining two locations in a geo-referenced coordinate system of said at least two different positions; and
determining a location of said pivot point based on said two locations and said approximate location of said pivot point.

27. The method as recited in claim 26, further comprising:
determining a current working arm pointing angle relative to a reference direction for a particular directional orientation of said working arm based on both a determined current location of said GNSS receiver antenna for said particular directional orientation and said location of the pivot point.

28. A non-transitory computer-usable storage medium having instructions embodied therein that when executed cause a computer system to perform a method for calibrating a crane for crane geometry, said method comprising:
receiving data from a Global Navigation Satellite System (GNSS) receiver antenna on a point along a boom assembly of said crane configured to pivot about a pivot point;
receiving an approximate location of said pivot point;
rotating a working arm of said crane about said pivot point to at least two different positions;
determining two locations in a geo-referenced coordinate system of said at least two different positions; and
determining a location of said pivot point based on said two locations and said approximate location of said pivot point.

29. The non-transitory computer-usable storage medium as recited in claim 28, further comprising:

determining a current working arm pointing angle relative to a reference direction for a particular directional orientation of said working arm based on both a determined current location of said GNSS receiver antenna for said particular directional orientation and said location of the pivot point.

\* \* \* \* \*